US012455757B2

(12) United States Patent
Sahita et al.

(10) Patent No.: US 12,455,757 B2
(45) Date of Patent: Oct. 28, 2025

(54) HYPERVISOR-MANAGED LINEAR ADDRESS TRANSLATION AND MEMORY INTEGRITY

(71) Applicant: Intel Corporation, Santa Clara, CA (US)

(72) Inventors: Ravi L. Sahita, Portland, OR (US); Kunal Mehta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 17/703,691

(22) Filed: Mar. 24, 2022

(65) Prior Publication Data
US 2022/0214909 A1 Jul. 7, 2022

(51) Int. Cl.
G06F 9/455 (2018.01)
H04L 9/08 (2006.01)

(52) U.S. Cl.
CPC ........ *G06F 9/45558* (2013.01); *H04L 9/0861* (2013.01); *G06F 2009/45583* (2013.01)

(58) Field of Classification Search
CPC ....... G06F 9/45558; G06F 2009/45583; H04L 9/0861
See application file for complete search history.

(56) References Cited

U.S. PATENT DOCUMENTS 9,330,020 B2 * 5/2016 Caprioli ............. G06F 12/1027
9,710,385 B2 * 7/2017 Mondal ................. G06F 9/3016
10,324,857 B2 * 6/2019 Nuzman ............. G06F 12/1036
10,503,664 B2 * 12/2019 Durham ................ G06F 12/145
10,515,023 B2   12/2019 Sahita et al.
11,030,113 B1 * 6/2021 Durham ............. G06F 12/1027
11,032,081 B1 * 6/2021 Zaman .................. H04L 9/3239
11,113,087 B2 * 9/2021 V ............................ G06F 21/62
11,150,928 B2 * 10/2021 Tsirkin .................. G06F 12/109

(Continued)

OTHER PUBLICATIONS

Intel Corporation, "Intel Architecture Instruction Set Extensions and Future Features, Programming Reference," Ref No. 319433-044, May 2021, available online at https://software.intel.com/content/dam/develop/external/us/en/documents/architecture-instruction-set-extensions-programming-reference.pdf, (Chapter 6, pp. 6-1 through 6-16), (26 pages).

(Continued)

*Primary Examiner* — Douglas M Slachta
(74) *Attorney, Agent, or Firm* — Alliance IP, LLC

(57) ABSTRACT

An apparatus provides a processor configured to execute instructions of a hypervisor to provide hypervisor-managed linear address translation (HLAT) with integrity protection. The processor is to execute the instructions to select a first key identifier for a first virtual machine to run on the hypervisor, invoke a first platform configuration instruction to configure the first key identifier in the processor including generating an encryption key for the first key identifier and setting an integrity mode for the first key identifier, instantiate the first virtual machine including a first guest kernel, the first guest kernel to allocate a plurality of HLAT paging structures to be used to translate a guest virtual address to a guest physical address of a first memory page allocated for the first virtual machine, mark the plurality of HLAT paging structures with read-only permission, and assign the first key identifier to the first memory page.

25 Claims, 18 Drawing Sheets

(56) References Cited

U.S. PATENT DOCUMENTS

| | | | |
|---|---|---|---|
| 11,436,161 B2* | 9/2022 | Sahita | G06F 9/45533 |
| 11,481,241 B2* | 10/2022 | Wallach | G06F 12/1036 |
| 12,021,980 B2* | 6/2024 | Ouziel | H04L 9/088 |
| 12,032,485 B2* | 7/2024 | Shanbhogue | G06F 12/1027 |
| 12,253,958 B2 | 3/2025 | Sahita et al. | |
| 2005/0076214 A1* | 4/2005 | Thomas | G06F 21/10 |
| | | | 705/52 |
| 2008/0126675 A1* | 5/2008 | Fu | G06F 12/1425 |
| | | | 711/E12.099 |
| 2010/0169666 A1* | 7/2010 | Dewan | G06F 21/36 |
| | | | 711/E12.091 |
| 2017/0177500 A1* | 6/2017 | Shanbhogue | G06F 12/1027 |
| 2017/0249173 A1* | 8/2017 | Tsirkin | G06F 9/45558 |
| 2018/0067866 A1* | 3/2018 | Shanbhogue | G06F 11/0787 |
| 2018/0121125 A1* | 5/2018 | Zeng | G06F 3/0622 |
| 2020/0073822 A1* | 3/2020 | Wallach | G06F 12/1009 |
| 2020/0201786 A1* | 6/2020 | Ouziel | G06F 12/0246 |
| 2020/0285498 A1* | 9/2020 | Keeth | G06F 12/145 |
| 2022/0283813 A1* | 9/2022 | Neiger | G06F 9/30145 |
| 2022/0309150 A1* | 9/2022 | Tsirkin | G06F 21/53 |
| 2022/0414266 A1* | 12/2022 | Preimesberger | G06F 21/602 |

OTHER PUBLICATIONS

Intel Corporation, "Intel Architecture Memory Encryption Technologies, Specification," Revision 1.3, Document No. 336907-003US, Apr. 2021, available online at https://kib.kiev.ua/x86docs/Intel/MemEncryption/336907-003.pdf (33 pages).

Intel Corporation, "Intel Trust Domain Extensions (Intel TDX)," Revision 1.3, Aug. 2021, available online at https://www.intel.com/content/www/us/en/developer/articles/technical/intel-trust-domain-extensions.html, (12 pages).

Intel Corporation, "Virtualization and Performance: Understanding VM Exits," Revision 1.3, Jun. 25, 2009, available online at https://www.facebook.com/notes/intel/virtualization-and-performance-understanding-vm-exits/97103992067/ (1 page).

\* cited by examiner

HYPERVISOR-MANAGED LINEAR ADDRESS TRANSLATION AND MEMORY INTEGRITY

TECHNICAL FIELD

The present disclosure relates in general to the field of processing systems, and more specifically, to hypervisor-managed linear address translation and memory integrity.

BACKGROUND

Virtual memory is a memory management technique that allows a larger range of memory to be used by programmers for data and code than is provided by the actual physical memory available to a processor. Address translation hardware is used in a computing system to map virtual addresses of a software program to physical addresses in physical memory. Address translation is performed using page tables, which are often susceptible to advanced kernel mode exploits. In addition, the final physical memory page to which a virtual address is translated can be susceptible to corruption by direct physical address manipulation. In a virtualized computing system, virtual machines utilize guest virtual addresses. Address translation in a virtualized computing system includes translating guest virtual addresses to guest physical addresses and translating guest physical addresses to host physical addresses in physical memory.

DETAILED DESCRIPTION

Figure 1:
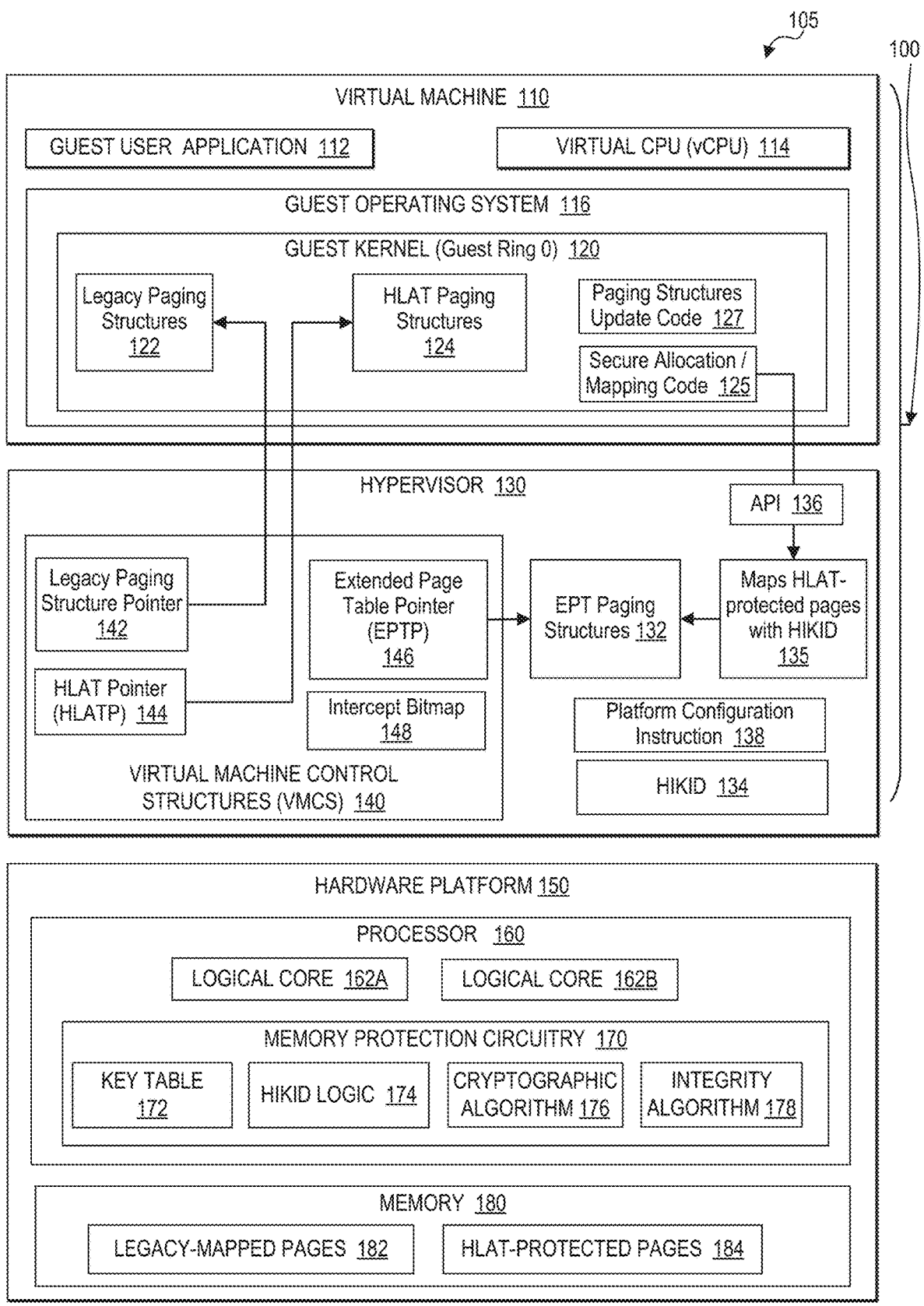
FIG. 1 is a block diagram illustrating an example computing system providing hypervisor-managed linear address translation (HLAT) and memory integrity for a virtual machine according to at least one embodiment.

The present disclosure provides various possible embodiments, or examples, of systems, methods, apparatuses, architectures, and machine readable media for hypervisor-managed linear address translation and memory integrity in virtualized computing systems. In particular, embodiments disclosed herein provide for combining hypervisor-managed linear address translation (HLAT) and protection of memory confidentiality and integrity.

Virtual memory is a feature of an operating system (OS) and is managed using address translation hardware to map virtual addresses of data and code to physical memory addresses (e.g., hardware storage addresses) in physical memory. A page table is the data structure stored in memory and populated by the operating system to store the mapping between virtual addresses and physical addresses. Virtual addresses are used by an executing program (e.g., a process) and physical addresses are used by computing system hardware, such as random access memory (RAM) and a processor. Virtual addresses are also known as 'linear addresses' and such terminology is used interchangeably herein.

Linear address translation can be performed using paging structures, such as Intel® Architecture (IA) page tables used in Intel® Architecture, 32-bit (IA-32) offered by Intel Corporation. In some scenarios, paging structures may be represented as a tree of tables (also referred to herein as a 'page table tree') in memory and used as input to the address translation hardware. The operating system provides a pointer to the root of the tree. The pointer is stored in a register (e.g., control register 3 (CR3) in the IA-32 architecture) and may contain or indicate (e.g., in the form of a pointer or portion thereof) the physical address of the first table in the tree. Page tables that are used to map virtual addresses of data and code to physical addresses may themselves be mapped via other page tables. When an operating system allocates memory and/or needs to map existing memory in the page tables, the operating system can manipulate the page tables that map virtual addresses of data and code as well as page tables that map virtual addresses of other page tables.

Each table (or paging structure) of a page table tree contains page table entries (PTEs) that are addressed using a base and an index. When a linear address is to be translated, the base for the first table (the root) in the paging hierarchy is provided by the pointer in the register. The index into the first page table is provided by a portion of the linear address to be translated. The entries of the tables that are located in the paging hierarchy prior to a last level page table, each contain a pointer to a next table in the paging hierarchy. Each table is indexed by a unique portion of the linear address to be translated. The table entries in the last level page table of the tree contain actual physical pages of memory. Thus, a linear address can be translated to a final physical page by walking the page table tree (also referred to herein as 'paging'), which includes following each pointer in an identified table entry to the next level table of the paging hierarchy, and using the appropriate index to locate another table entry with another pointer to another next level table and so on, until the last level page table is located. In addition, the tables themselves are maintained in pages of memory and may be mapped via other page tables.

In a virtualized computing system, a hypervisor (also referred to herein as a 'virtual machine manager', 'virtual machine monitor', or 'VMM') runs on a processor and one or more virtual machines run on top of the hypervisor. A respective guest operating system runs in each virtual machine. A guest operating system (or guest kernel) of a virtual machine manages guest virtual addresses (GVAs) for data and code associated with the processes running in the virtual machine. A guest virtual address is also known as, and referred to herein as, 'guest linear address' or 'GLA'. In linear address translation by a guest operating system, GVAs (or GLAs) are translated to respective guest physical addresses (GPAs), and GPAs are translated to respective host physical addresses (HPAs) in physical memory of the computing system.

Linear address translation using paging is often susceptible to advance kernel mode exploits that manipulate the page tables and bypass the protections provided by paging. At any given time, an operating system may need to manipulate page table pages that are used to map linear addresses to physical memory pages or to other page tables. Thus, page tables are typically maintained with read/write permission to enable the operating system to populate, read, and update the tables. In this scenario, however, any entity with kernel level privilege (e.g., ring 0 privilege) can modify the page tables. Consequently, an attacker could change the page tables to cause a linear address to be translated to a different, incorrect physical page. In another example, an attacker could cause multiple linear addresses to be translated to the same physical page. Additionally, an attacker with kernel level privilege could add a page table entry in a page table and provision a physical page in that entry.

A hypervisor-managed linear address translation (HLAT) technique may be used to mitigate page table attacks due to guest kernel exploits. One such example is the Intel® Virtualization Technology: Redirect Protection offered by Intel Corp. An HLAT mechanism allows HLAT paging structures embodied as a separate paging hierarchy to be protected with read-only permissions. For a given HLAT paging structure, such permissions are maintained in a PTE leaf of an extended page table (EPT) structure maintained by the hypervisor. The PTE leaf is a page table entry that contains the physical address into which a GPA is finally translated. Thus, an unauthorized entity with kernel level permission would be unable to write to the given HLAT paging structure. In at least some implementations, the HLAT paging structures may be maintained by a guest kernel of a virtual machine. In other implementations, the HLAT paging structures may be maintained by a separate secure kernel running parallel to the guest kernel of the virtual machine.

Additionally, each HLAT paging structure may be marked with a limited write permission (e.g., paging-write also referred to as 'PW') via the EPT PTEs for these HLAT paging structures. This limited write permission enables a CPU to set or unset certain bits in the PTEs of the HLAT paging structures that are accessed during a page walk. However, the limited write permission does not extend to modifying other bits, such as address bits of a GPA of the next EPT paging structure in the page walk. For example, a PTE in an HLAT paging structure may include certain metadata bits that indicate whether the PTE has been accessed (e.g., an accessed bit) during a page walk and whether the page has been written to (e.g., dirty bit). In this scenario, the processor can read PTEs in HLAT paging structures during a page walk and can set one or more of the metadata bits (e.g., accessed bit and/or dirty bit) as appropriate in the PTEs, but may not modify (or write to) other bits in the PTEs. An HLAT technique may also be designed to ensure that the final physical page can only be reached via HLAT paging structures. For example, a bit (e.g., called Verify-paging write (VPW) in Intel® Virtualization Technology: Redirect Protection) can be provided in EPT paging structures, and when used in an EPT-PTE leaf entry (e.g., to map the final page), this bit ensures that the final page can only be reached by paging structures in which the EPT-PW bit has been set. This prevents against an alias attack that could be carried out by modifying a page from a different virtual address, where the alias virtual address was mapped with read-write bits in the PTEs of the EPT paging structures.

Memory encryption technology can also be used to prevent exposure by encrypting specific pages of physical memory corresponding to virtual addresses of a virtual machine that are addressed using legacy paging structures rooted by a pointer in a CR3 register, for example. For example, the Intel® Multi-Key Total Memory Encryption (MKTME) enables a hypervisor (or VMM) to encrypt at least some areas of memory used by a virtual machine using an encryption key selected for the virtual machine. The hypervisor maintains another set of paging structures, referred to as extended page table (EPTs) structures, to map guest physical addresses (GPAs) obtained in paging structures in the virtual machine, to host physical addresses (HPAs) of physical memory. The GPAs can be generated by legacy paging structures rooted by the CR3 register, for example. A key identifier (ID) associated with an encryption key can be stored in bits of a pointer to the page stored in memory.

Although an HLAT technique can help mitigate advanced kernel mode exploits by providing ways for a hypervisor (or VMM) to guard guest page tables against attack (e.g., by making the tables read-only), the final physical page may still be susceptible to corruption caused by direct physical address manipulation. In a virtualized computing system, protection against attackers is needed for linear address translation to sensitive memory pages in addition to ensuring the confidentiality and integrity such memory pages.

A computing system providing hypervisor-managed linear address translation (HLAT) and memory integrity as disclosed herein can resolve many of the aforementioned issues (and more). In one or more embodiments, memory in a computing system running a hypervisor and one or more virtual machines is protected using a combination of techniques. One or more embodiments combine hypervisor-managed linear address translation with multi-key memory encryption in the OS/hypervisor stack, such that the linear address translation is guarded against kernel exploits and data and code at physical addresses are guarded against corruption. In addition, other cryptographic functions can be used to ensure the encrypted data and code at the physical addresses have not been altered. Thus, linear address translation protection is achieved along with integrity and confidentiality of data. This enables the OS/hypervisor to guard selected regions in memory to protect against modification and maintain confidentiality, while simultaneously protecting the page mapping of those data/code pages.

In one or more embodiments a guest OS/hypervisor can combine the use of HLAT, multi-key encryption, and integrity protection to achieve linear address translation with integrity protection and encryption of selected pages (e.g., code and data pages for sensitive OS modules, OS security agents, kernel extensions, etc.) allocated for the virtual machine. This enables the OS/hypervisor to detect splicing/relocation attacks against the HLAT-protected pages and hence, this creates a unique ring-0 enclave type of protection in a guest kernel. For example, the guest OS/hypervisor can protect data/code against corruption and also achieve protected linear address translation by using HLAT to protect against data/code modification via kernel level exploits. In one or more embodiments, a unique configuration of Intel® Multi-Key Total Memory Encryption (MKTME) with integrity protection, and hypervisor-managed linear address translation may be used to achieve multi-key encryption and integrity protection in a virtualized environment, where the virtualized environment may not necessarily provide a secure kernel to handle the HLAT page allocations and mapping.

With reference now made to the drawings, FIG. 1 is a block diagram illustrating an example computing system 105 providing hypervisor-managed linear address translation (HLAT) with integrity protection, and optionally encryption, in a virtualized environment 100 according to at least one embodiment. A brief discussion is now provided about some of the possible infrastructure that may be included in computing system 105. Computing system 105 may include a hardware platform 150, a virtual machine 110, and a hypervisor 130 (also known as a 'virtual machine monitor', 'virtual machine manager', and 'VMM'). The hardware platform 150 can include at least one physical processor 160, memory 180, and memory protection circuitry 170.

Generally, virtualization obscures hardware characteristics of a computing system and presents an abstract platform that can host other platforms, including different operating systems. Hypervisor 130 provides the capability of running multiple instances of operating systems (also referred to herein as 'guest operating system' or 'guest OS') and associated guest software concurrently in simulated computing environments known as 'virtual machines.' For example, in computing system 105, virtual machine 110 includes a virtual central processing unit (CPU) 114 on which a guest operating system (guest OS) 116 runs. Guest OS 116 manages, and coordinates resources for, a guest user application 112 logically running on guest OS 116 in virtual machine 110. Guest OS 116 includes a guest kernel 120, which runs in the highest privilege level (e.g., ring 0), although hypervisor 130 manages virtual machine's access to the hardware platform 150.

Generally, a hypervisor is embodied as a software program that enables the creation and management of the virtual machines. In computing system 105 of FIG. 1, hypervisor 130 may be a type-1 native/bare-metal hypervisor that runs directly on hardware (e.g., processor 160) to control the hardware and manage the guest operating system 106. In alternative configurations, hypervisor 130 may be a type-2 or hosted hypervisor that runs on an operating system. Physical hardware beneath hypervisor 130 may include processor 160 and memory 180.

A physical processor (or processor socket) typically refers to an integrated circuit, which potentially includes any number of other processing elements, such as cores or hardware threads. In computing system 105, processor 160 may include a central processing unit (CPU), a single-core or multi-core processor, a microprocessor, embedded processor, a digital signal processor (DSP), a system-on-a-chip (SoC), a co-processor, or any other processing device to execute code. In the example in FIG. 1, processor 160 may be a multi-threading, multicore processor that includes logical cores 162A and 162B. It should be apparent, however, that embodiments could be implemented in a single core processor or a multicore processor with two or more cores. Logical cores 162A-162B of processor 160 may represent distinct processing units that can run different processes, or different threads of a process, at the same time. Each logical core may include a respective thread of execution, and any number of logical cores could be running (or could be idle) on the physical processor at any given time. In some implementations, each logical core 162A-1642B represents a single physical core. In this scenario, physical processor 160 would include two physical cores corresponding respectively to the two logical cores 162A-162B. In other implementations (e.g., with hyperthreading), each physical core of a physical processor may include multiple logical cores. For example, physical processor 160 could contain a single physical core with two logical cores 162A and 162B.

Memory 180 can include any form of volatile or non-volatile memory including, without limitation, magnetic media (e.g., one or more tape drives), optical media, random access memory (RAM), dynamic random access memory (DRAM), read-only memory (ROM), flash memory, removable media, or any other suitable local or remote memory component or components. Memory 180 may be used for short, medium, and/or long term storage of computing system 105. Memory 180 may store any suitable data or information utilized by other elements of the computing system 105, including software embedded in a computer readable medium, and/or encoded logic incorporated in hardware or otherwise stored (e.g., firmware). Memory 180 may store data that is used by processors, such as processor 160. Memory 180 may also comprise storage for instructions that may be executed by processor 160 of computing system 105. Memory 180 may comprise one or more modules of system memory (e.g., RAM, DRAM) coupled to processor 160 in computing system 105 through memory controllers (which may be external to or integrated with the processors and/or accelerators). In some implementations, one or more particular modules of memory may be dedicated to a particular processor in computing system 105, or may be shared across multiple computing systems. Memory 180 may further include storage devices that comprise non-volatile memory such as one or more hard disk drives (HDDs), one or more solid state drives (SSDs), one or more removable storage devices, and/or other media.

Computing system 105 may also be provisioned with external devices (not shown), which can include any type of input/output (I/O) device or peripheral that is external to processor 160. Nonlimiting examples of I/O devices or peripherals may include a keyboard, mouse, trackball, touchpad, digital camera, monitor, touch screen, USB flash drive, network interface (e.g., network interface care (NIC), smart NIC, etc.), hard drive, solid state drive, printer, fax machine, other information storage device, accelerators (e.g., graphics processing unit (GPU), vision processing unit (VPU), deep learning processor (DLP), inference accelerator, application-specific integrated circuit (ASIC), field-programmable gate array (FPGA), etc.). Such external devices may be embodied as a discrete component communicatively coupled to hardware platform 150, as an integrated component of hardware platform 150, as a part of another device or component integrated in hardware platform 150, or as a part of another device or component that is separate from, and communicatively coupled to, hardware platform 150.

In one or more embodiments, hypervisor 130, guest kernel 120 of VM 110, and memory protection circuitry 170 of processor 160 are configured to cooperatively provide HLAT paging, encryption, and integrity validation for protected memory pages. Protected memory pages may include memory pages used by a guest kernel (e.g., in a protected linear range) including, but not necessarily limited to, code and data pages for sensitive OS modules, OS security agents, kernel extensions, etc. Hypervisor 130 and guest kernel 120 of VM 110 can also provide legacy paging for user space memory pages, which may or may not be encrypted and/or integrity validated based on the particular needs and implementations. HLAT paging structures 124 and legacy paging structures 122 are allocated in memory and maintained by guest kernel 120, and extended page table (EPT) paging structures 132 are allocated in memory and maintained by hypervisor 130. The allocation of HLAT paging structures 124 and legacy paging structures 122 in memory can occur when guest operating system 116 boots, for example, when hypervisor instantiates VM 110. The allocation of EPT paging structures 132 can occur when hypervisor 130 boots. It should be noted that, additional VMs may be instantiated by the hypervisor (possibly in cooperation with the original or root VM 110) and thus, such paging structures for the new VM may be allocated in memory after the boot process of hypervisor 130.

Legacy paging structures 122 and extended page table (EPT) paging structures 132 are used to perform linear address translation of virtual addresses of guest user space, such as those used by guest user application 112, to host physical addresses of pages in physical memory. Legacy paging structures 122 may be populated by guest kernel 120 with mapping information to map virtual addresses in guest user space (e.g., memory pages allocated by guest user application 112) to guest physical addresses (GPAs). The GPAs obtained from legacy paging structures 122 can be translated by hypervisor 130 via extended page table (EPT) paging structures 132, which are populated by hypervisor 130 with mapping information that maps the GPAs obtained from legacy paging structures 122 to host physical addresses (HPAs). The last HPA in the legacy/EPT page walk is the physical address of a physical memory page containing the data or code to be accessed when using the legacy-mapped virtual address. In addition, physical pages to which legacy-mapped virtual addresses are mapped are represented in FIG. 1 as legacy-mapped pages 182 and may optionally be encrypted and/or integrity protected based on particular needs and implementations.

Legacy paging structures 122 may be used to access physical pages (also referred to as 'frames') containing data and code that does not need the higher level of security provided by HLAT paging structures 124. Hypervisor 130 may mark legacy paging structures 122 with read/write permission, such that the guest kernel 120 can both read from and write to the legacy paging structures 122. EPT paging structures 132 that map the GPAs obtained during a legacy page walk may also be marked with read/write permissions so that hypervisor 130 can both read from and write to the EPT paging structures 132.

HLAT paging structures 124 and extended page table (EPT) paging structures 132 are used to perform linear address translation of virtual addresses used by guest kernel 120 (and potentially other memory selected for protection) to host physical addresses of pages in physical memory. HLAT paging structures 124 are populated by guest kernel 120 with mapping information to map virtual addresses used by guest kernel 120 to guest physical addresses (GPAs) for those HLAT-mapped virtual addresses. The GPAs obtained from the HLAT paging structures 124 can be translated by hypervisor 130 via extended page table (EPT) paging structures 132, which are populated by hypervisor 130 with mapping information that maps the GPAs obtained from the HLAT paging structures to host physical addresses (HPAs). The last HPA in an HLAT/EPT page walk is the physical address of a physical memory page containing the data or code to be accessed via the HLAT-mapped virtual address. The physical pages to which HLAT-mapped virtual addresses are mapped are represented in FIG. 1 as HLAT-protected pages 184 and can be encrypted based on an encryption key associated with VM 110. In addition, integrity validation may be provided for the encrypted HLAT-protected pages, as will be further described herein.

HLAT paging structures 124 may be used to access physical pages (or frames) containing data or code that is to be protected with a higher level of security (e.g., kernel memory pages, other memory selected for higher protection) than the protection provided by legacy paging structures 122. Accordingly, once memory is allocated for HLAT paging structures by guest kernel 120, hypervisor 130 can mark the HLAT paging structures with read-only permission. In at least some embodiments, the HLAT paging structures 124 may also be marked with a limited write permission (e.g., paging-write) that enables certain bits (e.g., accessed and dirty bits) in the table entries to be set or cleared as needed to facilitate page-walks. Thus, even if an attacker gains access to the guest kernel 120, the address information in the HLAT paging structures 124 cannot be modified by the attacker.

A hypervisor is configured to support both types of linear address translation (e.g., legacy and hypervisor-managed) in virtual machines, such as VM 110. A hypervisor can maintain a virtual machine data structure (VMCS) per virtual machine. A VMCS includes pointers to the roots of the various paging structures for the virtual machine. For example, hypervisor 130 maintains VMCS 140, which can include respective registers containing a legacy paging structure pointer 142 (e.g., CR3 or other suitable register or data structure) to the root of legacy paging structures 122, an HLAT pointer (HLATP) 144 to the root of HLAT paging structures 124, and an extended page table pointer (EPTP) to root of EPT paging structures 132. Once memory is allocated for legacy paging structures 122 and HLAT paging structures 124, guest kernel 120 can provision the paging structures 122 and 124 to VMCS 140 by passing legacy paging structure pointer 142 and HLATP 144 to hypervisor 130 so that the hypervisor can store the pointers in the appropriate registers or other suitable memory. After memory for EPT paging structures 132 is allocated, hypervisor 130 can provision EPT paging structures to VMCS 140 by storing the EPTP 146 in the appropriate register or other suitable memory.

When HLATP 144 is passed to hypervisor 130 and the hypervisor stores the HLATP in the appropriate register of VMCS 140, hypervisor 130 can also secure the HLAT paging structures 124. In at least one example, hypervisor 130 can mark HLAT paging structures 124 with read-only permission and potentially with a limited write permission, as previously described herein. Hypervisor 130 can mark the HLAT paging structures 124 with read-only and/or limited write permissions via leaf page table entries of page tables in EPT paging structures 132, where the leaf page table entries contain pointers to the HLAT paging structures 124. For example, certain bits in the leaf page table entries that are not used as part of the pointer (or address) may be used for read-only and limited write permissions.

Similarly, when legacy paging structure pointer 142 is passed to hypervisor 130 and the hypervisor stores the legacy page table pointer in the appropriate register of VMCS 140, hypervisor 130 can mark legacy paging structures 122 with read/write permissions via leaf page table entries of page tables in EPT paging structures 132 that contain pointers to the legacy paging structures 122. For example, certain bits in the leaf page table entries that are not used as part of the pointer (or address) may be used for the read/write permission.

The paging structure pointers may be configured in any suitable manner that enables location of their respective root page tables. For example, legacy paging structure pointer 142 and HLATP 144 may contain guest virtual addresses (GVAs), while EPTP 146 may contain a virtual address (VA). Although VMCS 140 is shown in hypervisor 130 in FIG. 1, it should be appreciated that this is a logical representation for ease of understanding, and that the paging structures pointers 142, 144, and 146 may be stored in registers of processor 160. It should also be appreciated, however, that other types of memory could be used for one or more of the pointers including, but not limited to, main memory, cache memory, or other processor storage. Similarly, legacy and HLAT paging structures 122 and 124 are illustrated in FIG. 1 in guest kernel 120, and EPT paging structures 132 are illustrated in FIG. 1 in hypervisor 130. It should be appreciated that this is a logical representation for ease of understanding, and that such paging structures are stored in memory 180, such as main memory, or any other suitable memory utilized by computing system 105.

In one or more embodiments, hypervisor 130 is configured to select a key identifier (referred to herein as 'HLAT Integrity key ID' or 'HIKID') to enable encryption and integrity protection for HLAT-protected pages 184 of VM 110. An HIKID 134 is selected for VM 110 and may be unique to VM 110 or may be unique to a selected group of VMs run by hypervisor 130. Thus, multiple HIKIDs may be provisioned by hypervisor 130 for respective virtual machines or respective groups of virtual machines. In one example, an HIKID may be randomly generated. In other examples, an HIKID may be deterministically generated (e.g., versioning). HIKID 134 may be selected by hypervisor 130. For example, hypervisor 130 may select HIKID 134 during the hypervisor 130 boot but before guest kernel 120 begins executing. If hypervisor 130 instantiates a new virtual machine after hypervisor 130 has booted, then hypervisor 130 can select an HIKID for the new virtual machine after the hypervisor 130 has booted but before the guest kernel of the new virtual machine begins executing. In other scenarios, the HIKID may be selected by the hypervisor during or even after the guest OS boots.

HIKID 134 may be linked, mapped, or otherwise associated with both an encryption key to be used for encrypting HLAT memory pages and an integrity mode setting to enable integrity protection for HLAT-protected pages 184. To achieve this, hypervisor 130 may invoke a platform configuration instruction 138 that can configure platform features of hardware platform 150. To configure the selected HIKID on hardware platform 150, the platform configuration instruction 138 can be executed to cause an encryption key for the HIKID to be generated. In addition, the platform configuration instruction can enable the integrity protection mode for the HIKID in the hardware to indicate that integrity values are to be generated and verified for the corresponding HIKID. In at least one implementation, a key table 172 may be maintained by the memory protection circuitry 170 to store information (e.g., encryption key, integrity mode setting) associated with each HIKID.

One nonlimiting example implementation of a platform configuration instruction is the Intel® Memory Encryption Technologies instruction PCONFIG used in Intel® 64 and IA-32 processors. Using the PCONFIG instruction as an example, various information may be used by the instruction to configure the HIKID on the hardware platform. For example, a data structure used by the PCONFIG instruction may include the following fields: a key control field (e.g., KEYID_CTRL) that contains information identifying an encryption algorithm to be used to encrypt HLAT-protected pages. The key control field (or another field) may contain an indication (e.g., one or more bits that are set to a particular value) that the integrity protection is to be enabled for the HLAT-protected pages. The data structure used by the PCONFIG instruction may further include a first key field (e.g., KEY_FIELD_1) that contains information specifying a software supplied encryption key (for directly programming the encryption key) or entropy data to be used to generate a random encryption key, and a second key field (e.g., KEY_FIELD_2) that contains information specifying a software (or hardware or firmware) supplied tweak key to be used for encryption with an encryption key or entropy data to be used to generate a random tweak.

In one or more embodiments, a hypervisor can also set up a virtual machine exit (VM exit) to prevent a virtual machine from re-provisioning an HIKID that has already been provisioned by the hypervisor to be assigned to, and enable integrity protection and encryption of, selected pages (e.g., code and data pages for sensitive OS modules, OS security agents, kernel extensions, etc.) allocated by the virtual machine. A VM exit marks the point at which a transition occurs from the VM currently running and the hypervisor to all the hypervisor to exercise some system control. Importantly, using a VM exit (or another suitable interception technique to remove control from the virtual machine, ring 0 code running on a VM can be blocked from re-provisioning an HIKID that has already been provisioned for the VM.

In computing system 105 for example, hypervisor 130 may configure an instruction setting for the platform configuration instruction (e.g., PCONFIG) so that if a platform configuration instruction is to be executed in any code running on VM 110, the instruction will be intercepted and a VM exit will be taken. Intercepting a platform configuration instruction is particularly important when the instruction is in ring 0 code (e.g., code running in guest kernel 120) because ring 0 code would have sufficient permissions to execute the platform configuration instruction and therefore, could potentially modify the encryption key and/or integrity mode associated with the HIKID already provisioned for the VM. In at least one embodiment, the instruction setting may be configured for a particular VM by populating an appropriate data control structure in a VMCS corresponding to the particular VM. For example, an intercept bitmap 148 may be populated to indicate that a platform configuration instruction (e.g., PCONFIG) in code executing in VM 110 is to be intercepted and a VM exit is to be taken from VM 110 before the instruction is invoked.

During runtime, when a platform configuration instruction is intercepted in code running in VM 110 and a VM exit is taken, hypervisor 130 can evaluate the HIKID specified in the intercepted instruction to determine whether it matches HIKID 134, which is already provisioned in the hardware platform for VM 110. If the HIKIDs match, then hypervisor 130 can block the intercepted instruction. In one example, the hypervisor 130 may issue a general protection fault. However, if the HIKIDs do not match, then hypervisor 130 may cause VM 110 to resume and allow the intercepted platform configuration instruction to execute.

During the course of execution, guest kernel 120 may allocate new memory to be securely mapped via HLAT with integrity and/or may determine that previously allocated memory mapped in legacy paging structures 122 should instead be securely mapped via HLAT with integrity. In one or more embodiments, guest kernel 120 can communicate with hypervisor 130 to achieve this. In one possible implementation, hypervisor 130 exposes an application programming interface (API) 136 to be used by guest kernel 120 to make requests of hypervisor 130 to enable the mapping of selected memory pages (e.g., newly allocated pages or currently allocated pages that are mapped via legacy paging structures) via HLAT with integrity protection. In one example, secure allocation/mapping code 125 may be part of the guest kernel binary, and paging structures update code 127 may run in guest kernel 120 (e.g., in guest ring 0). Secure allocation/mapping code 125 and paging structures update code 127 may communicate with hypervisor 130 via API 136 to enable HLAT paging structures 124 to be populated/updated with appropriate GVA-to-GPA mapping information for the selected memory pages. Once the HLAT paging structures 124 are modified with appropriate mapping information, the selected memory pages are HLAT-protected (e.g., HLAT-protected pages 184) and the secure allocation/mapping code 125 can request the hypervisor 130 via API 136 to map HLAT-protected pages 184 with HIKID 134 to enable integrity protection, and optionally encryption, of the HLAT-protected pages. At 135, to map HLAT-protected pages with HIKID, the hypervisor 130 can store the HIKID 134 in each EPT PTE leaf containing a host physical address (HPA) of one of the HLAT-protected pages.

In these scenarios, where guest kernel 120 has allocated new memory and/or determined that previously allocated memory mapped in legacy paging structures 122 should instead be securely mapped via HLAT with integrity, guest kernel 120 can modify HLAT paging structures 124 to add and/or update the appropriate GVA-to-GPA mapping information, and to potentially allocate new HLAT paging structures if needed. In at least some embodiments (e.g., when guest kernel is not a secure kernel), guest kernel 120 may communicate with hypervisor 130 to request that the paging structures update code 127 be marked as executable. Once the paging structures update code 127 is marked as executable, the code 127 can be executed in guest ring 0. If existing HLAT paging structures 124 are to be used, then code 127 may request the hypervisor 130 (e.g., via API 136) to unlock the HLAT paging structures 124 (e.g., via EPT paging structures). If new HLAT paging structures are needed, then the guest kernel may allocate memory for the new HLAT paging structures. Code 127 can then modify the appropriate HLAT paging structures 124 (e.g., add and/or update mapping information in one or more entries of the HLAT paging structures). Once the appropriate modifications are made, paging structures update code 127 can request the hypervisor 130 to lock the modified/new HLAT paging structures 124. Subsequently, guest kernel 120 can request the hypervisor 130 to change the execute permission of paging structures update code 127 to non-executable again.

Guest kernel 120 can also invoke API 136 to request hypervisor 130 to map new HLAT-protected pages with HIKID 134 to enable integrity protection, and optionally encryption. Guest kernel 120 can provide, to hypervisor 130, the GPA(s) that, when translated via EPT paging structures, reveal an EPT PTE leaf containing an HPA of an HLAT-protected page. In response, hypervisor 130 can map the specified GPA(s) in the EPT paging structures 132 and can provision HIKID 134 in the EPT page table entry (PTE) leaf for the final physical page. By provisioning HIKID 134 in the EPT PTE leaf, the final physical page can be integrity plus confidentiality protected, in addition to the HLAT protection provided by mapping in the HLAT paging structures. It should be noted that hypervisor 130 can also store, in each EPT PTE leaf, appropriate access permissions (e.g., read/write, read-only) and another setting (e.g., verify paging-write) to ensure that only HLAT paging structures are used to access the HLAT-protected page(s). In other embodiments where guest operating system 116 includes a parallel secure guest kernel that provides a protected kernel runtime, hypervisor 130 can request the secure guest kernel to handle the HLAT mapping as HLAT paging structures may already have read/write permissions for the secure kernel, and the paging structures update code 127 may be executable when a secure guest kernel is present or incorporated as part of the secure guest kernel binary.

As illustrated in FIG. 1, processor 160 may also include memory protection circuitry 170 to provide encryption and integrity protection of data and/or code stored in HLAT-protected pages 184. In some scenarios, legacy-mapped pages 182 may also be protected by encryption and/or integrity. In one or more embodiments, memory protection circuitry 170 may include a key table 172, HIKID logic 174, a cryptographic algorithm 176, and an integrity algorithm 178. Key table 172 may contain each HIKID that has been provisioned by hypervisor 130 for a virtual machine or a group of virtual machines. Key table 172 may be configured to link each HIKID to an encryption key (and/or a tweak for encryption) that is unique to the HLAT-protected pages to which the HIKID is assigned. Key table 172 may also be configured to link each HIKID to an integrity mode setting that indicates whether the integrity mode is set for the HIKID. When the integrity mode is set for an HIKID, integrity protection is enabled for HLAT-protected pages to which the HIKID is assigned. Other information may also be linked to HIKIDs including, but not necessarily limited to, an encryption mode (e.g., whether to encrypt or not, type of encryption).

HIKID logic 174 may be invoked for each memory access in which the targeted memory of a memory access request is included in a physical page to which an HIKID is assigned. When a page walk is performed by processor 160 (e.g., a CPU), and the final EPT PTE leaf containing the HPA of the final physical page is accessed, the processor can recognize an HIKID based on the bits in which the HIKID is stored in the EPT PTE leaf. In one example, the HIKID may be stored in two (or more) unused bits of the HPA stored in the EPT PTE leaf, and memory protection circuitry 170 can recognize and evaluate the HIKID. It should be apparent, that any number of bits could be used to store an HIKID based on the particular implementation and/or the available unused bits in the HPA stored in the EPT PTE leaf. HIKID logic 174 can evaluate the HIKID using key table 172 and determine whether encryption is enabled for the final physical page in which the targeted memory is located, and if so, what type of encryption is enabled. The key table 172 can also be used by HIKID logic 174 to determine whether integrity mode is set for the HIKID such that integrity protection is enabled for the final physical page in which the targeted memory is located.

If encryption is enabled, then cryptographic algorithm 176 can be used to encrypt the data or code to be stored in the targeted memory, or to decrypt the data or code read from the targeted memory. An encryption key (and/or tweak) can be associated with the HIKID in key table 172 and used in the cryptographic algorithm. Cryptographic algorithm 176 may be configured as any suitable form of cryptography including block cipher cryptography. Advanced Encryption Standard (AES) has been the mainstay for data encryption for decades, using a 128 bit block cipher. The disclosed embodiments, however, are not intended to be so limited and can easily be adapted to accommodate various sizes of a block cipher (e.g., 64-bit, 48-bit, 32-bit, 16-bit, etc. using Simon, Speck, tweakable K-cipher, PRINCE or any other block cipher), or other suitable forms of cryptography to encrypt memory.

If the integrity mode is set for the HIKID, then integrity algorithm 178 can be used to validate the integrity of the data or code that is being read, and/or to generate an integrity value for data or code that is to be stored in the targeted memory being accessed. Generally, a memory integrity technique can include a process that uses some type of integrity value associated with some data or code to be protected to ensure the validity of the data or code during its lifecycle. Each time data or code in memory is accessed, an integrity check can be performed to ensure that the data (or code) has not changed since its previous validation.

Integrity values for targeted memory of a physical memory page can be calculated using a suitable cryptographic technique (e.g., encryption, one-way hashing) over any suitable portion of (or all of) the physical memory page. In one implementation, integrity values can be computed based on a cache line in which the targeted memory is located. If the memory access is a read operation, then an integrity value may be computed over the cache line that is retrieved from the targeted memory. The computed integrity value may be compared to the stored integrity value for the cache line. A match validates the integrity of the data or code in the targeted memory. A mismatch indicates that integrity validation has failed and an appropriate fault can be raised. If the memory access is a write operation, then an integrity value may be calculated over the cache line to be stored in the targeted memory. The computed integrity value may be stored in the appropriate location in memory (e.g., as part of the cache line, in separate memory, etc.).

In one or more embodiments, integrity algorithm 178 may be used to detect memory corruption and prevent physical attacks on the HLAT-protected pages 184. One example integrity technique that may be implemented by integrity algorithm 178 uses an integrity value in the form of a message authentication code (MAC). A MAC is a value derived by applying a MAC algorithm and a key to data or code to be protected. The MAC can be attached to the data or code and, when the data or code is subsequently accessed or otherwise obtained, the same MAC algorithm and key may be applied to the data or code. A comparison between the attached MAC and the newly generated MAC can reveal whether the data or code has been changed. Thus, any unauthorized modifications can be detected.

Another memory integrity technique that may be implemented by integrity algorithm 178 includes a cryptographic hash function and is referred to as a hash message authentication code (HMAC). An HMAC can be derived using a key and a cryptographic hash function. Generally, a cryptographic hash function is an algorithm that converts an input value and returns a fixed-length output value in a different size. A hash algorithm may or may not use a key. Examples of hash algorithms include, but are not limited to, a Secure Hash Algorithm (e.g., SHA1, SHA2, SHA3) or a Message Digest 5 (MD5). Other memory integrity techniques can include, but are not necessarily limited to, error correction codes (ECCs) and integrity check values (ICVs).

In a computing system in which HLAT with integrity protection is configured, direct modifications to HLAT-protected pages 184 can be detected by memory protection circuitry 170. For example, a data or code in an HLAT-protected page 184 could potentially be modified directly by a splicing/relocation attack. In this scenario, the memory modification could be detected by memory protection circuitry 170 during a subsequent memory access to the address where the attack occurred as the memory protection circuitry 170 would be unable to validate the integrity of the memory contents. In response to being unable to validate the integrity of an HLAT-protected page 184, memory protection circuitry could generate a fault (e.g., machine check exception). The hypervisor 130 could intercept the generated fault and take appropriate action for the target virtual machine 110.

One or more embodiments described herein provides a guest OS/hypervisor with protected linear address translation for critical page mappings that the guest OS/hypervisor want to protect. Embodiments also provide confidentiality and integrity of HLAT-protected pages 184. Accordingly, the guest OS effectively receives a ring-0 integrity protected enclave with protected mapping. Such protection is a significant primitive for virtualization based security, where a guest OS owner may want to protect some pages against ring-0 malware or against splicing/relocation attacks.

Figure 2:
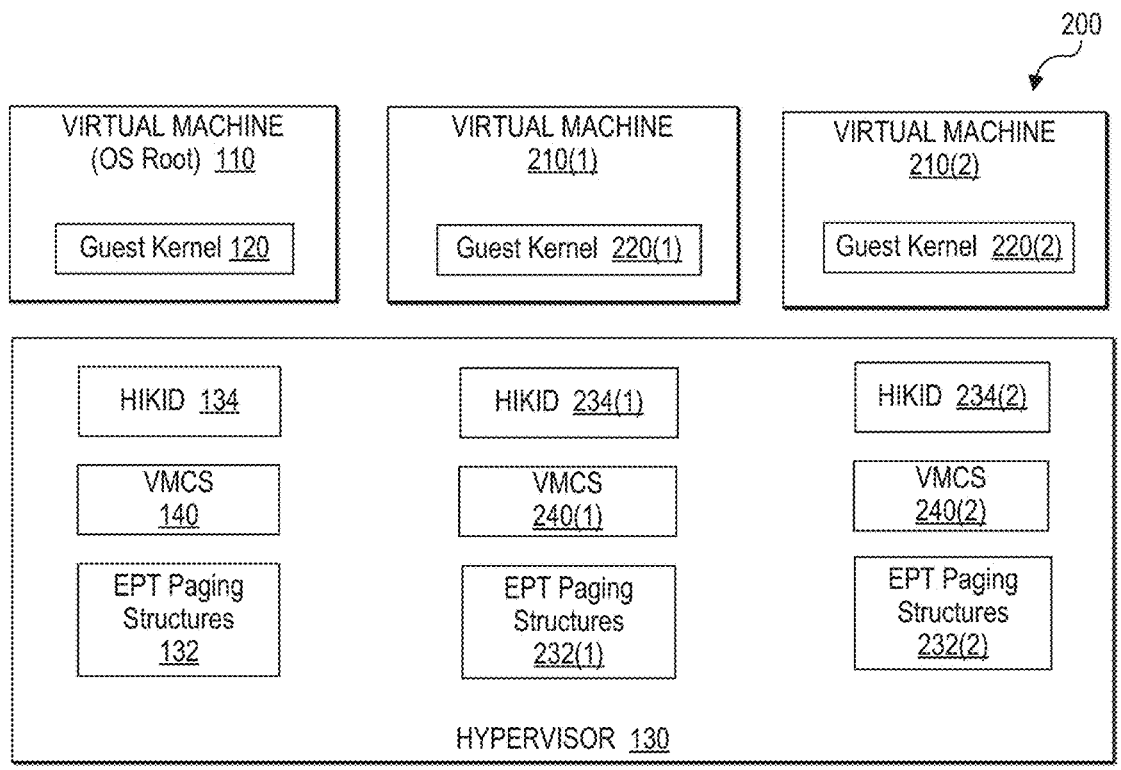
FIG. 2 is a block diagram illustrating an example computing system with multiple virtual machines that provides HLAT and memory integrity for the multiple virtual machines according to at least one embodiment.
Figure 3:
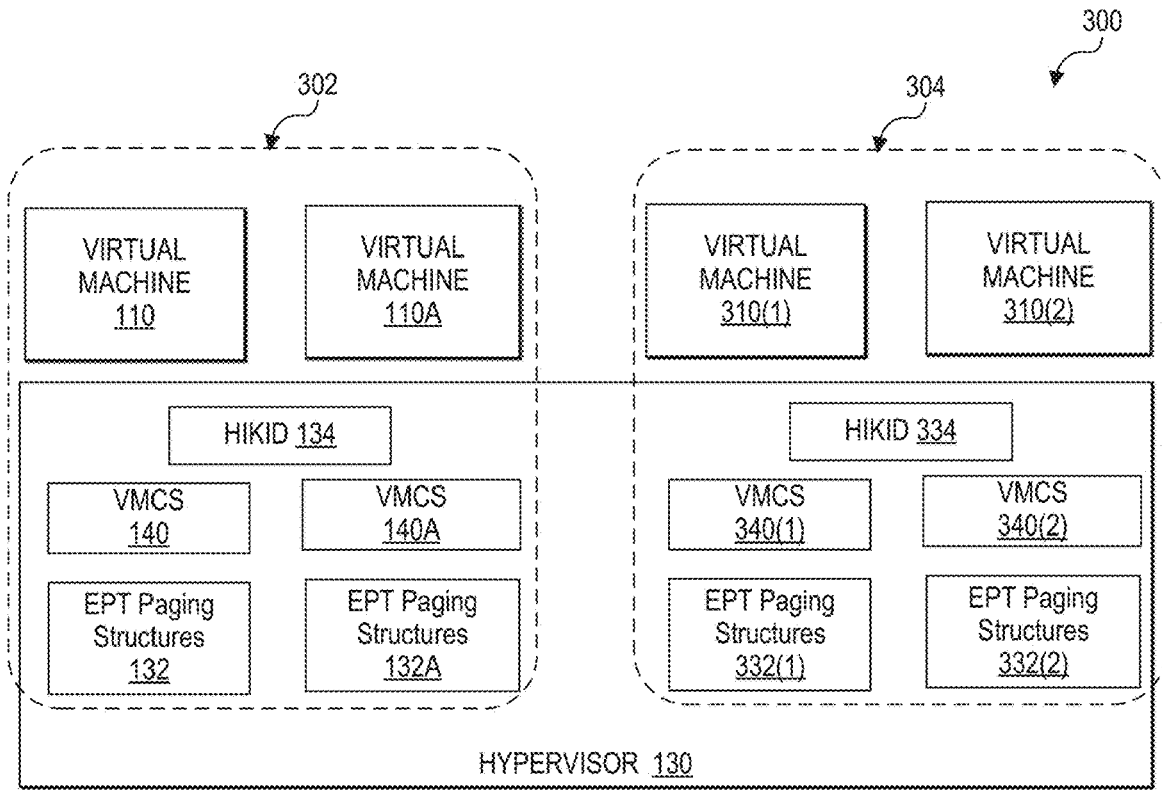
FIG. 3 is a block diagram illustrating an example implementation of HLAT and memory integrity in a cloud environment according to at least one embodiment.

Turning to FIGS. 2-3, block diagrams illustrate other example virtualized environments of computing system 105 that provide HLAT with integrity protection and optionally encryption. For simplicity, not all of the components shown and described in FIG. 1 are propagated to FIGS. 2-4. It should be understood, however, that such components are assumed to be included in an implementation of the virtualized environments of FIGS. 2-4 unless otherwise stated.

With reference to FIG. 2, virtualized environment 200 includes two additional virtual machines 210(1) and 210(2) running on hypervisor 130. In this implementation, virtual machine 110 may provide a guest operating system root that communicates with hypervisor 130 to facilitate the instantiation of the other virtual machines 210(1) and 210(2). It should be appreciated that three virtual machines 110, 210(1) and 210(2) are shown for illustrative purposes only and that any number of virtual machines may be instantiated on hypervisor 130 based on the particular needs and implementations.

Virtual machines 210(1) and 210(2) may be configured with components similar to virtual machine 110. For example, virtual machines 210(1) and 210(2) may each have a guest user application (e.g., guest user application 112), a virtual CPU (e.g., vCPU 114), and a guest operating system (e.g., guest OS 116). Guest kernels 220(1) and 220(2) of virtual machines 210(1) and 210(2) may be part of guest operating systems of the virtual machines. Like guest kernel 120 of virtual machine 110, guest kernel 220(1) of virtual machine 210(1) and guest kernel 220(2) of virtual machine 210(2) can each allocate memory for respective HLAT paging structures and legacy paging structures. Guest kernels 220(1) and 220(2) can also each include respective instances of secure allocation/mapping code and paging structures update code that are the same or similar to secure allocation/mapping code 125 and paging structures update code 127 of guest kernel 120.

Hypervisor 130 may work cooperatively with guest kernels 220(1) and 220(2) and memory protection circuitry 170 to provide HLAT with integrity protection, and optionally encryption, for selected memory pages (e.g., code and data pages for sensitive OS modules, OS security agents, kernel extensions, etc.) allocated to virtual machines 210(1) and 210(2). Accordingly, each guest kernel 220(1) and 220(2) may perform the same or similar operations as guest kernel 120, and interact with hypervisor 130 in the same or similar manner as guest kernel 120. API 136 can also be exposed to guest kernels 220(1) and 220(2) to achieve the HLAT with integrity protection in virtual machines 210(1) and 210(2).

In a virtualized environment with multiple virtual machines as shown in FIG. 2, hypervisor 130 can select a unique HIKID for each virtual machine. For example, HIKID 134 is selected and used only for virtual machine 110, and hypervisor 130 can select a second HIKID 234(1) for virtual machine 210(1), and a third HIKID 234(2) for virtual machine 210(2). Because virtual machine 110 is the OS root, HIKID 134 may be selected by the hypervisor during the hypervisor's boot. However, virtual machines 210(1) and 210(2) may be instantiated after the boot of hypervisor 130 and virtual machine 110. In this scenario, HIKID 234(1) may be selected by hypervisor 130 during the boot of virtual machine 210(1), and HIKID 234(2) may be selected by hypervisor 130 during the boot of virtual machine 210(2). In one illustrative example, if HIKID is implemented in two bits, then bits 00 could be selected as HIKID 134, bits 01 could be selected as HIKID 234(1), and bits 10 could be selected as HIKID 234(2). It should be appreciated that HIKID may be implemented in any suitable number of bits based on particular needs and implementations.

Similar to virtual machine 110, for virtual machines 210(1) and 210(2), hypervisor 130 allocates memory for EPT paging structures 232(1) and 232(2), respectively. Hypervisor 130 also maintains virtual machine control structures (VMCS) 240(1) and 240(2) for virtual machines 210(1) and 210(2), respectively. Thus, each virtual machine can have HLAT-protected pages that are protected with integrity and possibly encryption. Different encryption keys are used for each virtual machine's HLAT-protected pages, and integrity validation is performed for each virtual machine's HLAT-protected pages.

In FIG. 3, virtualized environment 300 includes three additional virtual machines running on hypervisor 130, where two virtual machines 110 and 110A are assigned to a first group 302 (e.g., tenant, container, etc.) and two other virtual machines 310(1) and 310(2) are assigned to a second group 304. It should be appreciated that more or less virtual machines may be instantiated in each group 302 and 304, and that more or less groups may be created by hypervisor 130 based on the particular needs and implementations.

Virtual machines 110A, 310(1), and 310(2) may be configured with components similar to virtual machine 110. For example, virtual machines 110A, 310(1), and 310(2) may each have a guest user application (e.g., guest user application 112), a virtual CPU (e.g., vCPU 114), a guest operating system (e.g., guest OS 116), and a guest kernel (e.g., 120). Like guest kernel 120 of virtual machine 110, guest kernels of virtual machines 110A, 310(1), and 310(2) can each allocate memory for respective HLAT paging structures and legacy paging structures. Guest kernels of virtual machines 110A, 310(1) and 310(2) can also each include respective instances of secure allocation/mapping code and paging structures update code that are the same or similar to secure allocation/mapping code 125 and paging structures update code 127 of guest kernel 120.

Hypervisor 130 may work cooperatively with guest kernels of virtual machines 110A, 310(1), and 310(2) and memory protection circuitry 170 to provide HLAT with integrity protection, and optionally encryption, for protected memory pages allocated to virtual machines 110A, 310(1), and 310(2). Accordingly, each guest kernel of virtual machines 110A, 310(1), and 310(2) may perform the same or similar operations as guest kernel 120, and interact with hypervisor 130 in the same or similar manner as guest kernel 120. API 136 can also be exposed to guest kernels of virtual machines 110A, 310(1), and 310(2) to achieve the HLAT with integrity protection in virtual machines 110A, 310(1), and 310(2).

In a virtualized environment with multiple groups of virtual machines as shown in FIG. 3, hypervisor 130 can select a unique HIKID for each group of virtual machines. For example, HIKID 134 is used only for virtual machines 110 and 110A, and hypervisor 130 may select a second HIKID 334 for virtual machines 310(1) and 310(2). In one illustrative example, if HIKID is implemented in two bits, then bits 00 could be selected as HIKID 134, and bits 11 could be selected as HIKID 334. It should be appreciated that HIKID may be implemented in any suitable number of bits based on particular needs and implementations. Additionally, like virtual machine 110, for virtual machines 110A, 310(1), and 310(2), hypervisor 130 allocates memory for EPT paging structures 132A, 332(1), and 332(2), respectively. Hypervisor 130 also maintains virtual machine control structures (VMCS) 140A, 340(1) and 340(2) for virtual machines 110A, 310(1), and 310(2), respectively. Thus, each virtual machine can have HLAT-protected pages that are protected with integrity and possibly encryption. Different encryption keys are used for each group of virtual machine's HLAT-protected pages, and integrity validation is performed for each virtual machine's HLAT-protected pages.

Figure 4:
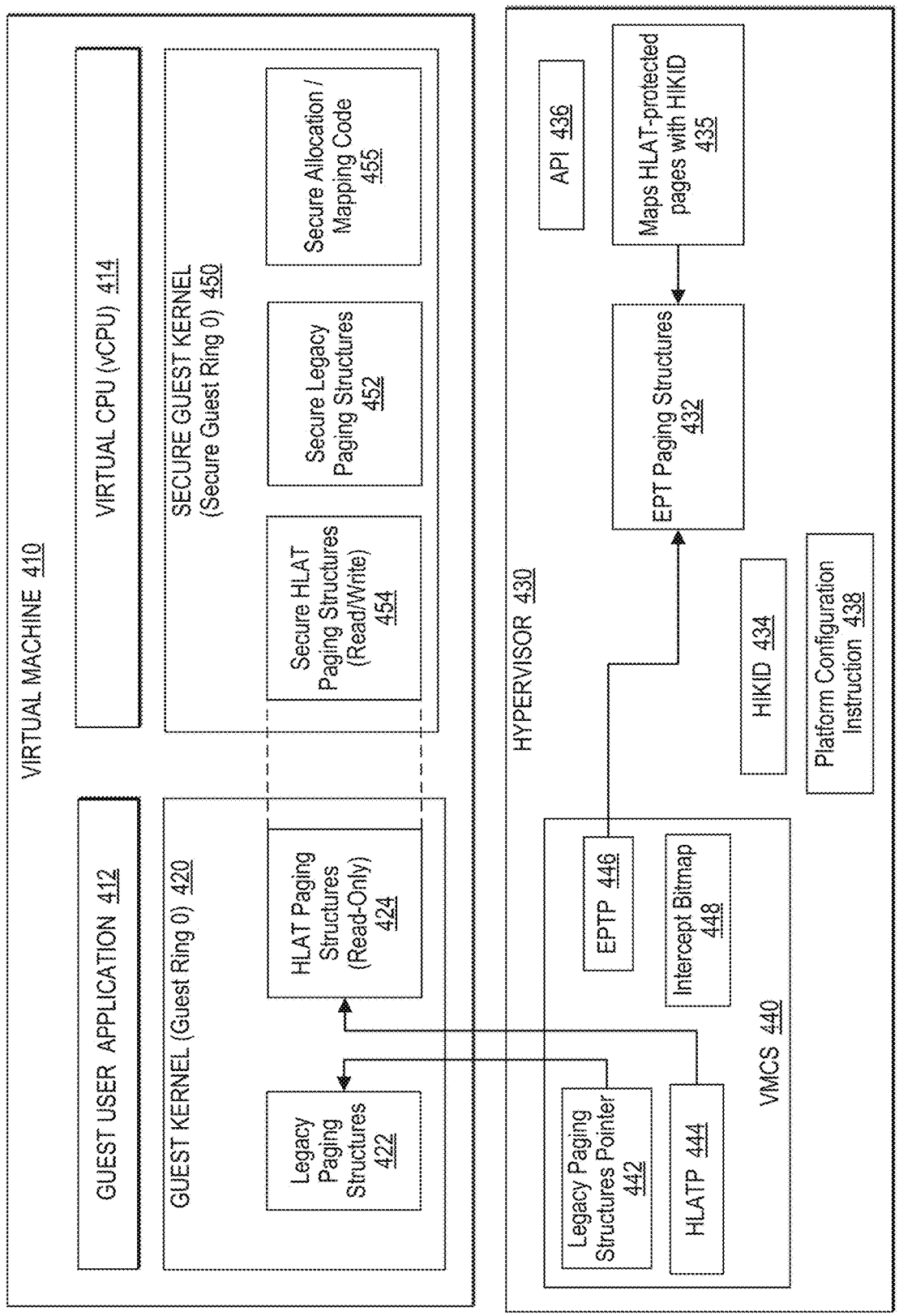
FIG. 4 is a block diagram illustrating an example of a virtual machine including a secure kernel using HLAT and memory integrity according to at least one embodiment.

In FIG. 4, a block diagram illustrates another example virtualized environment 400 of a computing system (similar to computing system 105 of FIG. 1) that provides HLAT with integrity protection and optionally, encryption. Virtualized environment 400 includes a virtual machine 410 running on a hypervisor 430 and having a secure guest kernel 450 in addition to a regular guest kernel 420. For simplicity, a hardware platform is not illustrated, but it should be understood that hypervisor 430 can run on the same or similar hardware platform as shown and described with reference to hardware platform 150 of FIG. 1. It should also be appreciated that a single virtual machine 410 is shown in FIG. 4 for illustrative purposes only and that any number of virtual machines or groups of virtual machines may be instantiated on hypervisor 430 based on the particular needs and implementations.

Virtual machine 410 includes a guest user application 412, a virtual CPU 414, guest kernel 420, and secure guest kernel 450. Guest kernel 420 and secure guest kernel 450 may be running in a guest operating system (not shown). Guest kernel 420 is illustrated with legacy paging structures 422 and HLAT paging structures 424, similar to legacy paging structures 122 and HLAT paging structures 124 shown in guest kernel 120 of FIG. 1. With a secure guest kernel in virtualized environment 400, however, HLAT paging structures 424 may be provisioned and maintained as secure HLAT paging structures 454 by secure guest kernel 450. HLAT paging structures 454 can be mapped with read/write permissions in secure legacy paging structures 452 of secure guest kernel 450. However, HLAT paging structures 454 are mapped with read-only permissions to the normal guest kernel 420 via EPT paging structures 432 of hypervisor 430. Accordingly, the normal guest kernel 420 has a read-only view of the secure HLAT page tables 454, which are maintained by secure guest kernel 450.

Secure guest kernel 450 can be configured as another binary that runs separately from guest kernel 420. When guest kernel 420 needs secure operations to be performed, such as the set up and maintenance of secure HLAT paging structures 454, then guest kernel 420 can send a request to hypervisor 430 to cause secure guest kernel 450 to perform the needed operations. For example, guest kernel 420 can notify hypervisor 430 that certain operations are needed (e.g., kernel memory allocation and resulting HLAT paging structure modification) and in response, hypervisor can send a request to secure guest kernel 450 to perform the needed operations.

Hypervisor 430 maintains a VMCS 440 with similar data structures as previously described with reference to VMCS 140 in FIG. 1. Hypervisor 430 also allocates and maintains EPT paging structures 432, which are similar to EPT paging structures 132 of FIG. 1. Hypervisor 430 may select an HIKID 434 for virtual machine 410 and may configure the HIKID 434 on the hardware platform using a platform configuration instruction 438 as previously described herein, for example with respect to HIKID 134 and platform configuration instruction 138. VMCS 440 includes a legacy paging structures pointer (e.g., in a CR3 register) that includes an address for legacy paging structures 422 maintained by guest kernel 420 (or to secure legacy paging structures 452 maintained by secure guest kernel 450). VMCS 440 also includes an HLATP 444 that provides an address for secure HLAT paging structures 424. VMCS 440 further includes an EPTP 446 to EPT paging structures 432 maintained by hypervisor 430.

VMCS 440 may further include an intercept bitmap 448 in which an instruction setting (e.g., one or more bits) can be configured for platform configuration instruction 438. Accordingly, if platform configuration instruction 438 is to be executed in any code running on VM 410, the instruction will be intercepted and a VM exit will be taken. When a VM exit is taken, control may be passed to hypervisor 430. Taking a VM exit can prevent the guest kernel 420 and secure guest kernel 450 from attempting to invoke the platform configuration instruction using the HIKID 434, which has already been provisioned by hypervisor 430, and is (or will be) assigned to selected memory pages that are allocated by virtual machine 410 and that are to be protected via HLAT with integrity and possibly encryption.

Hypervisor 430 may work cooperatively with secure guest kernel 450 and memory protection circuitry (e.g., memory protection circuitry 170 in FIG. 1) to provide HLAT with integrity protection, and optionally encryption, for one or more selected memory pages (e.g., kernel pages, OS pages, other critical pages) that are allocated to virtual machine 410. When guest kernel 420 allocates new memory to be securely mapped via HLAT with integrity and/or determines that previously allocated memory mapped in legacy paging structures 422 should instead be securely mapped via HLAT with integrity, guest kernel 420 can invoke API 136 to communicate with hypervisor 430 to achieve this. In response to a request from guest kernel 420, hypervisor 430 can request secure guest kernel 450 to modify HLAT paging structures 424 to add and/or update the appropriate GVA-to-GPA mapping information for the one or more selected memory pages (e.g., newly allocated pages or currently allocated pages that are mapped via legacy paging structures), and to potentially allocate new HLAT paging structures if needed. In response to a request from hypervisor 430, secure guest kernel 450 may populate and update mapping information (e.g., GPA(s)) in secure HLAT paging structures 454 for the one or more selected memory pages.

Hypervisor 430 may further include an API 436 that is exposed to secure guest kernel 450 to enable secure kernel 450 to communicate with hypervisor 430. Secure guest kernel 450 can use API 436 to request hypervisor 430 to secure the one or more selected memory pages via EPT paging structures 432 with integrity and possibly encryption. Securing the one or more selected memory pages with integrity (and possibly encryption) can be achieved by the hypervisor storing HIKID 434 in each EPT PTE leaf for the one or more selected memory pages. Hypervisor 430 may also mark each EPT PTE leaf of the one or more selected memory pages with a verify paging-write permission and an appropriate permission for reading and writing to the selected memory page.

Secure kernel 450 may also request hypervisor 430 to protect any new HLAT paging structures 424 via EPT paging structures 432. In response, hypervisor 430 can mark each EPT PTE leaf of the new HLAT paging structures 424 as read-only. Thus, guest kernel 420 would be unable to modify the HLAT paging structures 424. Secure legacy paging structures 452, however, may provide mappings to the secure HLAT paging structures 454 and provide read/write access to secure guest kernel 450. Hypervisor 430 may also mark each EPT PTE leaf of the new HLAT paging structures 424 with a limited write permission (e.g., paging-write).

In one example implementation, secure allocation/mapping code 455 of secure guest kernel 450 may be part of the secure guest kernel binary and may be configured to perform one or more of the operations described with respect to secure guest kernel 450. For example, secure allocation/mapping code 455 may be configured to update the mapping information in the secure HLAT paging structures 454, to request hypervisor 430 to secure one or more selected memory pages with integrity and possibly encryption, and/or to request the hypervisor to secure the HLAT paging structures 424 via EPT paging structures 432. Secure allocation/mapping code 455 may provide hypervisor 430 with the GPA(s) of the one or more selected memory pages that are to be secured via HLAT with integrity and possibly encryption.

Figure 5:
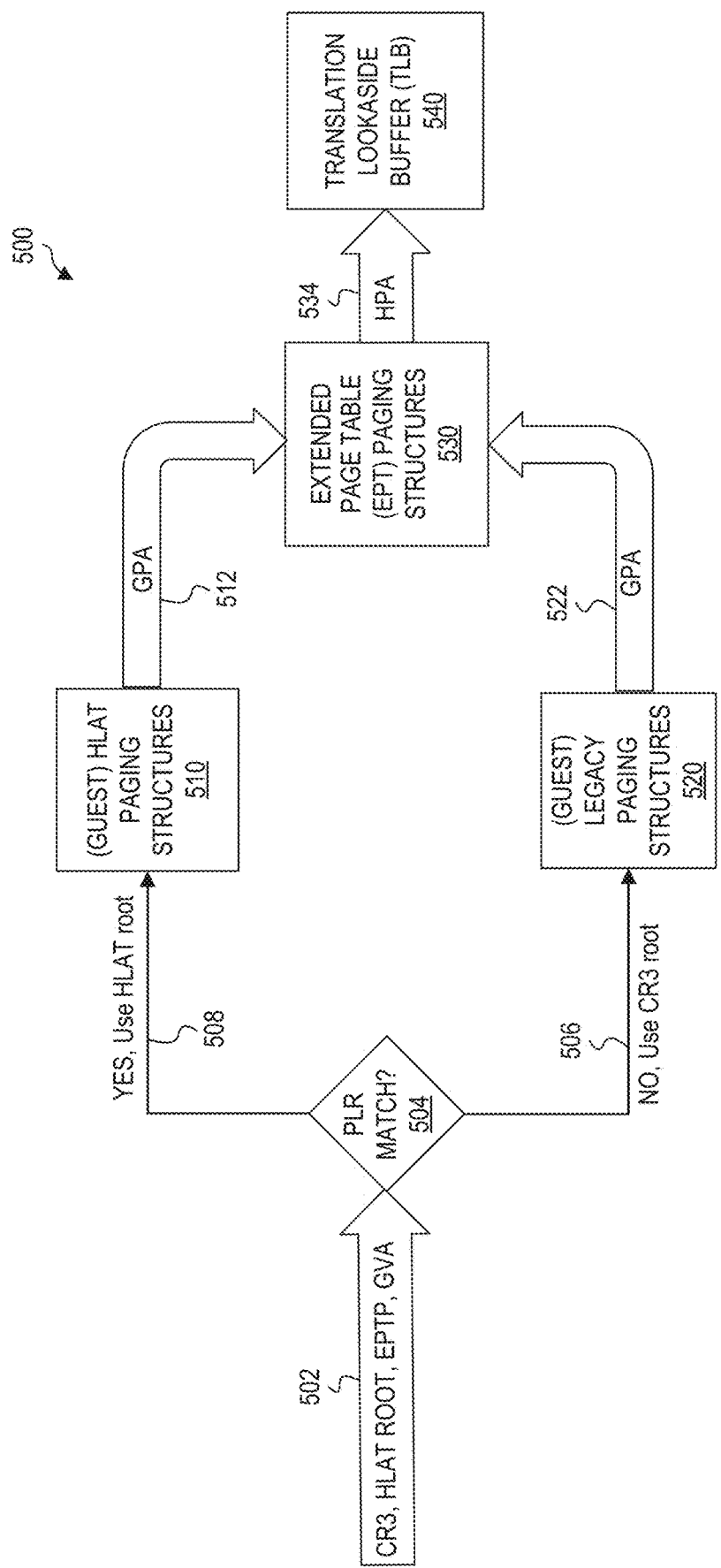
FIG. 5 is high level flow diagram of hypervisor execution control of guest virtual address translation when HLAT is enabled.

Turning to FIG. 5, FIG. 5 is high level flow diagram of hypervisor execution control 500 of guest virtual address (GVA) translation to host physical address (HPA) when HLAT is enabled. HLAT paging structures may be provisioned (e.g., memory has been allocated for HLAT paging structures and the HLAT paging structures have been populated with mapping information), for example, as shown in virtualized environments 100, 200, 300, or 400 of FIGS. 1, 2, 3, and 4. For ease of understanding, reference may be made to components of computing system 105 in FIG. 1 to describe hypervisor execution control 500 of a GVA-to-HPA translation when HLAT is enabled. However, it should be appreciated that such hypervisor execution control 500 is applicable to other virtualized environments (e.g., 200, 300, 400, etc.) in which HLAT with integrity and encryption is implemented.

Hypervisor execution control 500 of GVA-to-HPA translation may be performed when a memory access is requested by virtual machine 110. For example, memory access may be requested by a guest user application 112, a system application of guest operating system 116, or a system application of guest kernel 120, for example. A memory access request 502 could be associated with, for example, a read or write command that includes HLATP 144, legacy paging structure pointer 142, EPTP 146, and the targeted GVA for the memory access. At 504, processor 160 determines whether the targeted GVA of the memory access request 502 is in a protected linear range (PLR), which is a range of memory addresses that are protected by processing circuitry. Such addresses could include, for example, kernel code, data pages for sensitive OS modules, OS security agents, kernel extensions, and any other data or code that is designated for protection. In some implementations, certain bits (e.g., upper unused bits) in the targeted GVA may be used by processor 160 to determine whether the GVA corresponds to a protected page and is to be translated through HLAT paging structures.

If it is determined that the targeted GVA received in the memory access request 502 is not in the PLR, or is not otherwise designated for HLAT protection (e.g., by selected bits in the GVA), then a traditional EPT page walk may be performed. For example, the legacy paging structure pointer 142 (e.g., CR3) can be used at 506 to identify the root of legacy paging structures 520 (e.g., legacy paging structures 122) and the page walk may proceed through the legacy paging structures 520, which may generate a GPA 522, or potentially a page fault exception and VM exit if a terminal or permission fault occurs. The resulting GPA 522 may be forwarded to EPT paging structures 530 (e.g., EPT paging structures 132), which may then generate an HPA 534 or potentially, a VM exit may be reported to the hypervisor 130 if a permission fault occurs. The GVA, HPA, and permissions may be reported to translation lookaside buffer (TLB) 540. TLB 540 comprises at least a memory cache to store recent translations of guest virtual memory to physical addresses for faster retrieval by processor 160.

If at 504, it is determined that the targeted GVA received in the memory access request 502 is in the PLR, or is otherwise designated for HLAT protection (e.g., by selected bits in the GVA), then an HLAT page walk may be performed. For example, the HLATP 144 can be used at 508 to identify the root of HLAT paging structures 510 (e.g., HLAT paging structures 124) and the page walk may proceed through the HLAT paging structures 510, which may generate a GPA 512, or potentially a page fault exception and a VM exit if a terminal or permission fault occurs. The resulting GPA 512 may be forwarded to EPT paging structures 532 (e.g., EPT paging structures 132), which may then generate an HPA 534 or potentially, a VM exit may be reported to the hypervisor 130 if a permission fault occurs. The GVA, HPA, and permissions may be reported to translation lookaside buffer (TLB) 540. TLB 540 comprises at least a memory cache to store recent translations of guest virtual memory to physical addresses for faster retrieval by processor 160.

Figure 6:
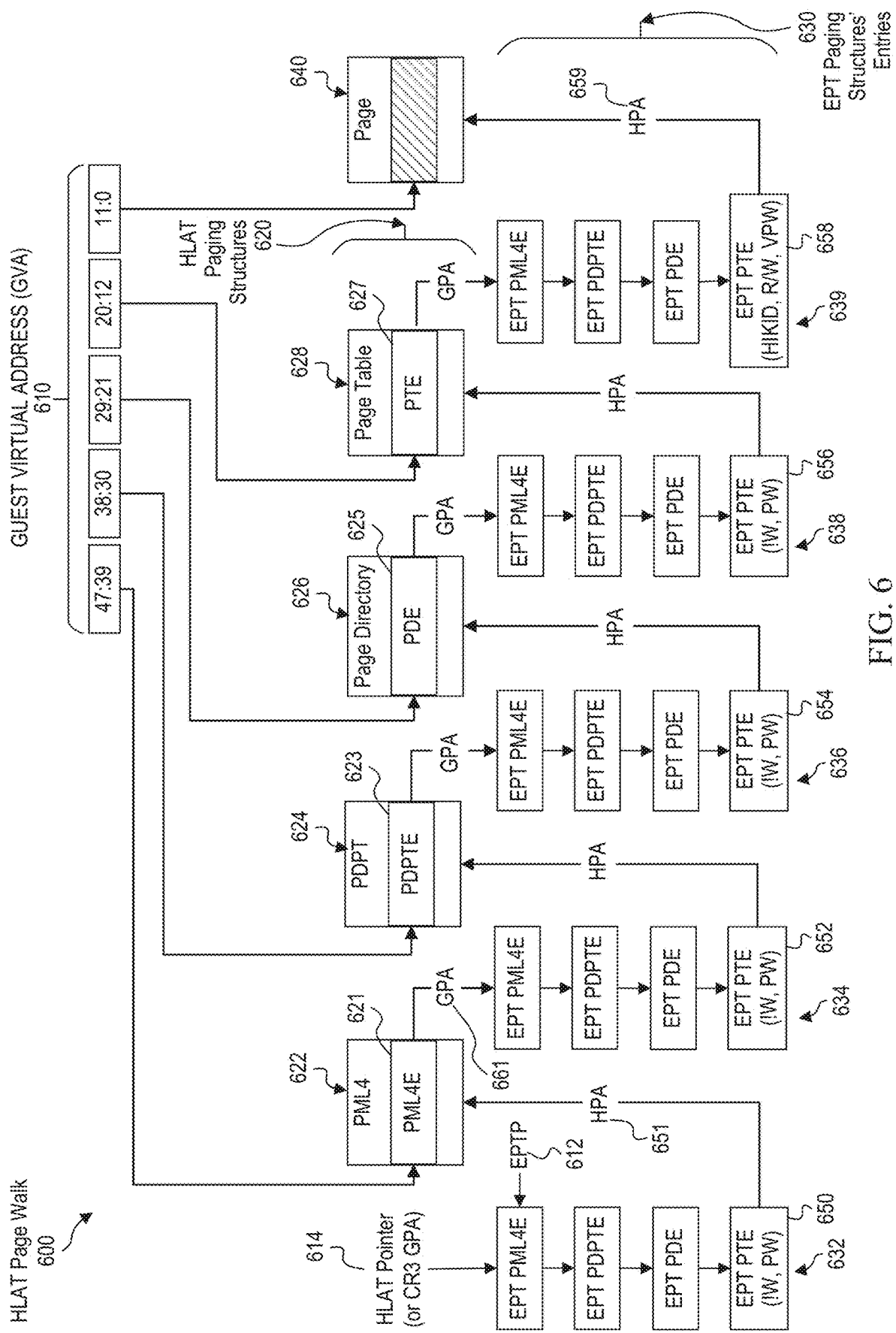
FIG. 6 is a flow diagram of an HLAT page walk with extended page tables (EPTs) or legacy page walk with EPTs.

FIG. 6 is a flow diagram of an HLAT page walk 600 with EPT paging structures according to at least one embodiment. HLAT page walk 600 is performed by a processor (e.g., processor 160) walking HLAT paging structures to translate a GVA 610 to an HPA 659 using HLAT paging structures 620 and EPT paging structures. Although EPT paging structures are not illustrated, EPT paging structures' entries 630 that are located during the page walk are shown. HLAT paging structures 620 are representative of various HLAT paging structures (e.g., 124, 424, 454, 510) shown and described herein, and EPT paging structures' entries 630 are representative of entries that may be obtained from EPT paging structures (e.g., 132, 232(1), 232(2), 132A, 332(1), 332(2), 432, 530) shown and described herein. Generally, HLAT page walk 600 is an example page walk that may occur in any of the embodiments herein in which a memory access request (e.g., read, write, move, etc.) is invoked and a targeted guest virtual address is within a protected linear range or is otherwise designated for protection (e.g., by upper bits of the GVA).

HLAT paging structures 620 can include a page map level 4 table (PML4) 622, a page directory pointer table (PDPT) 624, a page directory (PD) 626, and a page table (PT) 628. EPT paging structures also include four levels of paging structures. The EPT paging structures can include an EPT PML4, an EPT PDPT, an EPT PD, and an EPT PT. Each of the HLAT paging structures 620 and each of the EPT paging structures include entries that are addressed using a base and an index. Entries of the HLAT paging structures 620 that are located during HLAT page walk 600 for GVA 610 include PML4E 621, PDPTE 623, PDE 625, and PTE 627. Entries of the EPT paging structures that are located during HLAT page walk 600 include groups of entries 632, 634, 636, 638, and 639.

During an HLAT page walk, EPT paging structures translate an HLAT pointer (HLATP) and guest physical addresses (GPAs) provided by the HLAT paging structures to host physical addresses (HPAs). HLAT paging structures map the HPAs provided by the EPT paging structures to the GPAs that are translated by the EPT paging structures. When GVA 610 is to be translated, the base for the first table (the root) in the paging hierarchy of the EPT paging structures, which is EPT PML4, is provided by the EPTP 612, which may be in a register in a VMCS (e.g., 140, 140A, 240(1), 240(2), 340(1), 340(2), 440).

The index into the first EPT paging structure is provided by a portion of the HLAT pointer (HLATP) 614 to be translated. The entries of the EPT paging structures that are accessed in the EPT paging hierarchy, prior to the last level EPT PT, each contain a pointer to the next EPT paging structure in the paging hierarchy, and each EPT paging structure is indexed by a unique portion of the HLATP 614 to be translated. The entry that is accessed in the last level of the EPT paging hierarchy (e.g., EPT PTE) contains an HPA 651, which is the base for the first HLAT paging structure, PML4 622, which is indexed by a unique portion of GVA 610 (e.g., bits 47:39 of GVA). The identified entry, PML4E 621 contains the next GPA 661 to be translated by the EPT paging structures. Again, the base for the first table (the root) in the EPT paging hierarchy is provided by the EPTP 612, and a unique portion of the next GPA 661 to be translated is used as an index. The page walk continues through the EPT paging structures as previously described using unique portions of the particular GPA being translated to index into the EPT paging structures, and through HLAT paging structures, until a EPT PTE leaf containing the base address of the final physical page 640 is accessed.

In HLAT page walk 600, EPT PTE 658 is the leaf and translates to HPA 659, which is the base for the final physical page 640 containing the targeted memory of the memory access request. A unique portion of GVA 610 (e.g., bits 11:0) is used with HPA 659 to index final physical page 640 to locate the targeted memory at the final physical address within final physical page 640.

Prior to the HLAT page walk 600, during HLAT page mapping operations by the hypervisor and guest kernel, an HIKID (e.g., 132) associated with the virtual machine (e.g., 110) is assigned to the final memory page 640. The HIKID may be assigned to the final memory page 640 by the hypervisor (e.g., 130) storing the HIKID in designated bits of EPT PTE leaf 658. The hypervisor may store the HIKID in the EPT PTE leaf 658 after the physical page 640 has been allocated by the guest kernel and mapped in the HLAT paging structures 620, and the guest kernel requests the hypervisor to map the HLAT-protected page 640 with integrity. The HIKID can indicate that the contents (e.g., data and/or code) of physical page 640 are to be protected using encryption and integrity validation. The hypervisor can also store the appropriate access permission setting (e.g., read/write, read-only) in designated bit(s) of EPT PTE leaf 658. The hypervisor can further store an appropriate setting in one or more other designated bit(s) of EPT PTE leaf 658 to prevent an alias attack (e.g., verify paging-write (VPW)).

Other EPT PTEs 650, 652, 654, and 656 hold the base address for respective HLAT paging structures 622, 624, 626, and 628. These EPT PTEs can be marked as read-only (!W) and paging-write (PW) in one or more embodiments to secure the HLAT paging structures as previously described herein.

Figure 7:
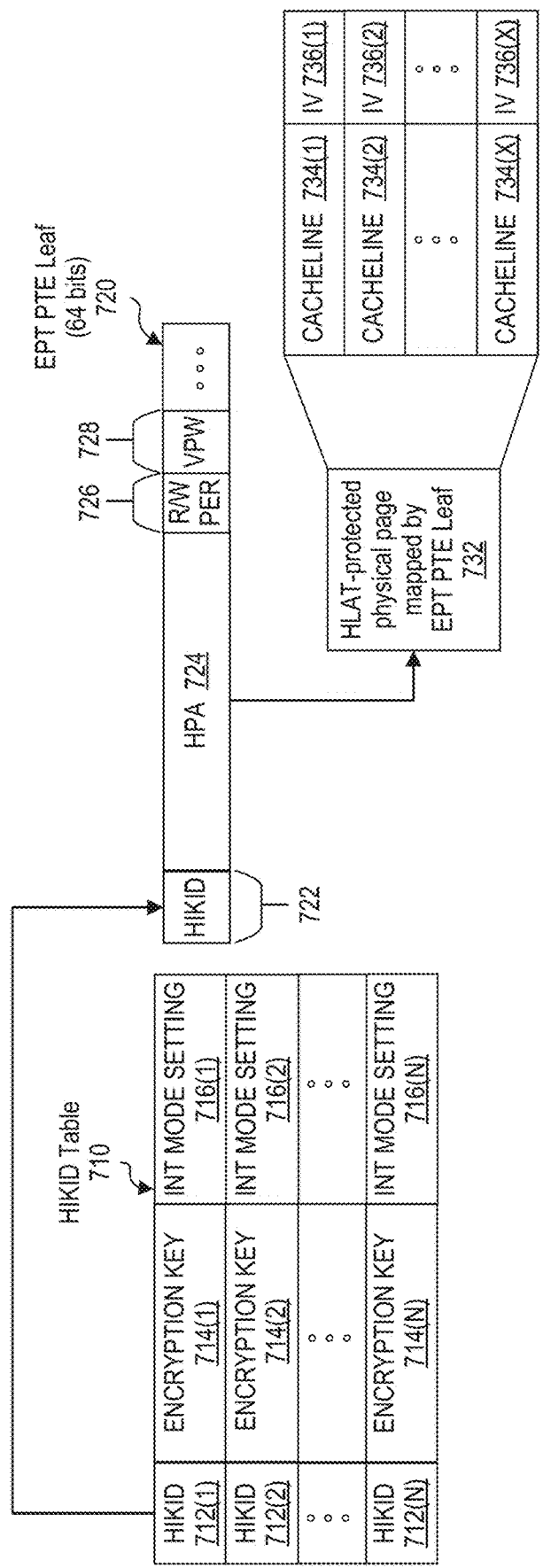
FIG. 7 is a block diagram of an example page table entry of an extended page table according to at least one embodiment.

Turning to FIG. 7, FIG. 7 is a block diagram of an example EPT PTE leaf 720 of an EPT page table according to at least one embodiment. The EPT PTE leaf 720 represents one possible example of EPT PTE leaf 658 that is accessed in HLAT page walk 600 of FIG. 6. For ease of understanding, EPT PTE leaf 720 could be one possible implementation of EPT PTE leaves in EPT page tables of EPT paging structures 132 in computing system 105. Accordingly, reference to computing system 105 and its components is made in the description of FIG. 7.

In one embodiment, EPT PTE leaf 720 can be a 64-bit entry encoded with an HIKID 722 that is selected by a hypervisor (e.g., hypervisor 130) for a virtual machine (e.g., virtual machine 110) or group of virtual machines. EPT PTE leaf 720 also includes a host physical address (HPA) 724, which is the base address for an HLAT-protected physical page 732 containing data and/or code to be accessed. EPT PTE leaf 720 can further include read/write permission settings 726 in one or more other bits. The read/write permission settings 726 can indicate whether the HLAT-protected final physical page 732 has read/write permissions or read-only permission, for example. EPT PTE leaf 720 may also include a VPW bit 728 that may be used to prevent an alias attack as previously described herein. Although EPT PTE leaf 720 is described as a 64-bit entry, it should be apparent that EPT entries could include any number of bits based on particular needs and/or implementations.

The HIKID 722 encoded in EPT PTE leaf 720 may be stored in hardware and associated with an encryption key and an integrity mode setting. In one example, an HIKID table 710 is an example of key table 172 provisioned in memory protection circuitry 170 of processor 160. HIKID table 710 can include HIKIDs 712(1)-712(N) mapped to respective encryption keys 714(1)-714(N) and respective integrity modes settings 716(1)-716(N). Encryption keys 714(1)-714(N) may represent unique cryptographic keys to be used in cryptographic algorithms to encrypt and decrypt data and/or code stored in a physical memory pages associated with the corresponding HIKIDs 712(1)-712(N). Integrity mode settings 716(1)-716(N) may indicate whether integrity protection is enabled for data and/or code stored in physical memory pages associated with the corresponding HIKIDs 712(1)-712(N).

The HPA 724 of EPT PTE leaf 720 is the base address of the HLAT-protected physical page 732. In one implementation, HLAT-protected physical page 732 can be defined by multiple cache lines 734(1)-734(X) containing data and/or code within the page. The cache lines 734(1)-734(X) may be encrypted with an encryption key associated with HIKID 722. Thus, if the HIKID 722 encoded in EPT PTE leaf 720 for the HLAT-protected physical page 732 is HIKID 712(2), then memory protection circuitry (e.g., memory protection circuitry 170) can encrypt/decrypt the cache line(s) 734(1)-734(X) containing the targeted memory using encryption key 714(2). When other memory access requests are received for other targeted memory in other cache lines of the HLAT-protected physical page 732, the page walk will resolve to the same EPT PTE leaf and, therefore, the same HIKID will cause the memory protection circuitry to encrypt/decrypt these other cache lines containing the other targeted data (or code).

Memory encryption technology can also be used to prevent exposure by encrypting specific pages of physical memory corresponding to virtual addresses of a virtual machine that are addressed using legacy paging structures rooted by a pointer in a CR3 register. For example, the Intel® Multi-Key Total Memory Encryption (MKTME) enables a hypervisor (or VMM) to encrypt at least some areas of memory used by a virtual machine using an encryption key selected for the virtual machine. The hypervisor maintains another set of paging structures, referred to as extended page table (EPTs) structures, to map guest physical addresses (GPAs) obtained in paging structures in the virtual machine, to host physical addresses (HPAs) of physical memory. The GPAs can be generated by legacy paging structures rooted by the CR3 register, for example. A key identifier (ID) associated with an encryption key can be stored in bits of a pointer to the page stored in memory.

With integrity protection enabled, an integrity value (e.g., IV 736(1)-736(X)), such as a message authentication code (MAC), can be generated for each cache line 734(1)-734(X) of the HLAT-protected physical page 732 and may be stored in the error correction code (ECC) memories where metadata bits are available or re-purposed to store the integrity value with the cache line. In other implementations, the integrity value may be stored in memory sequestered or stolen from system memory, for example, by the basic input output system (BIOS) during boot, or in any other suitable memory or storage. When accessing memory during a read operation, a cache line (e.g., 734(1)-734(X)) may be retrieved and brought into the processor. In this case, another integrity value can be computed over the retrieved cache line and compared to the stored integrity value (e.g., 736(1)-736(X)) for the cache line. If the computed integrity value and the stored integrity value match, then the integrity of the cache line is validated. If the computed integrity value and the stored integrity value do not match, then the hardware will raise a fault. If the integrity values match, then the read operation can be completed by returning the requested data from the cache line of the memory page. Thus, the HLAT-protected physical page 732 cannot be modified via an alias mapping. Rather, the integrity protection of the HLAT-protected pages ensures that modifications to HLAT-protected pages are made from the same mapping.

Figure 8:
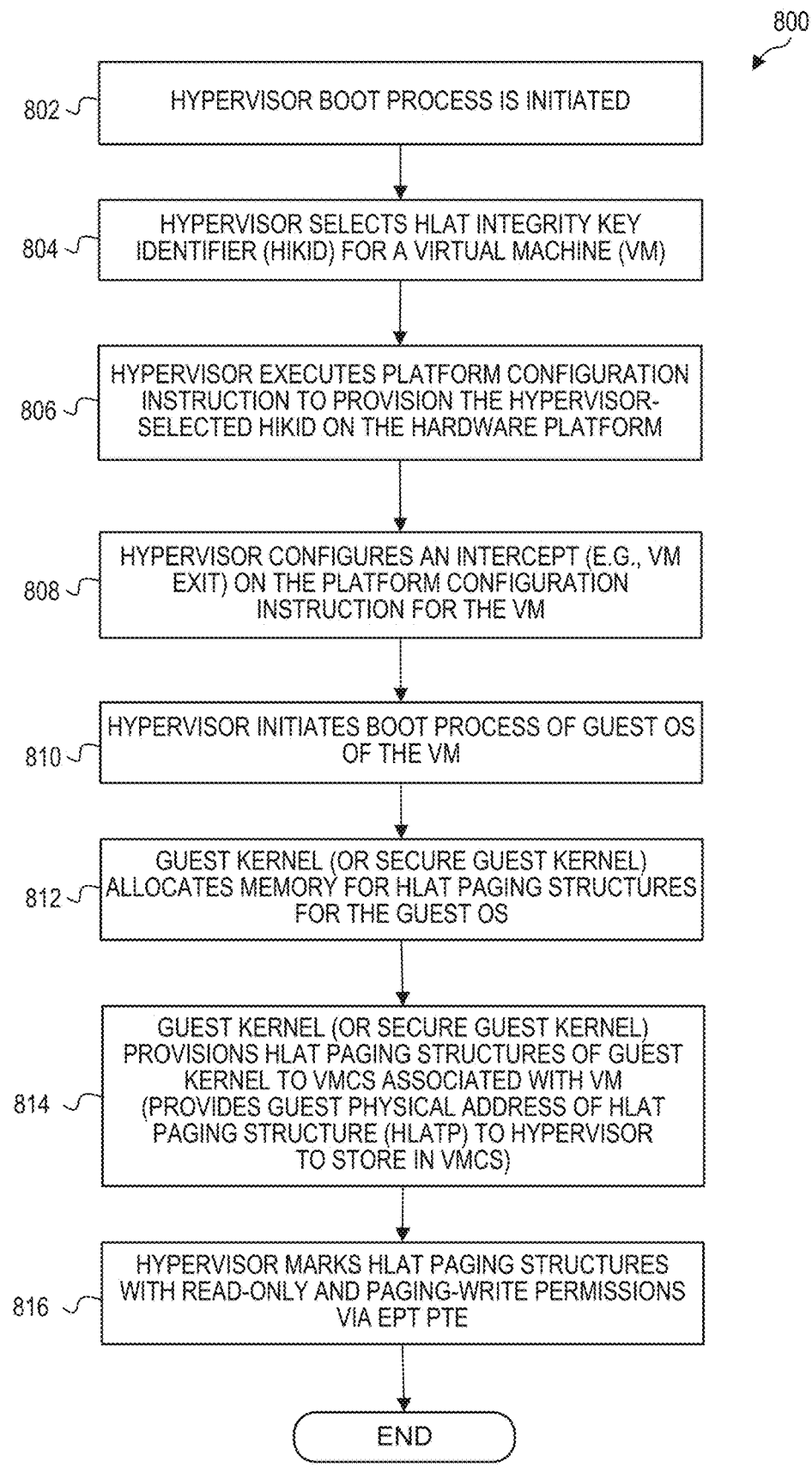
FIG. 8 is a flow diagram of an example process for configuring hypervisor-managed linear address translation and memory integrity for a virtual machine according to at least one embodiment.

FIG. 8 is a flow diagram 800 of example operations to configure HLAT with memory integrity and encryption for a virtual machine (VM) running on a hypervisor in a computing system according to at least one embodiment. A computing system (e.g., computing system 105) may comprise means such as one or more processors (e.g., 160), for performing the operations. In one example, at least some operations shown in flow diagram 800 may be performed by a hypervisor (e.g., 130, 430).

The operations may begin at 802, when a hypervisor boot process is initiated. At 804, the hypervisor randomly or deterministically selects a hypervisor-managed linear address translation integrity key identifier (HIKID) for a VM to be instantiated by the hypervisor.

At 806, the hypervisor executes a platform configuration instruction (e.g., PCONFIG) to provision the hypervisor-selected HIKID on a hardware platform of the computing system. For example, the platform configuration instruction could provision the HIKID in memory protection circuitry (e.g., 170) of the processor (e.g., 160). Once an HIKID is provisioned in hardware, the HIKID can be assigned to one or more memory pages to enable encryption/decryption and integrity protection for those memory pages. Provisioning the HIKID can include setting an integrity mode for the HIKID (e.g., by storing a certain value in an integrity mode setting associated with the HIKID or using any other suitable technique). If the integrity mode is set for the HIKID, integrity protection is enabled for any memory to which the HIKID is assigned. The HIKID may be unique to a particular VM of a plurality of VMs to be instantiated on the hypervisor. In other implementations, the HIKID may be unique to a group of VMs (e.g., a tenant, etc.) of a plurality of groups of VMs and may be used to provide HLAT with integrity and encryption protection for each of the VMs in the group. Other HIKIDs may be selected and provisioned for other groups of VMs.

At 808, the hypervisor can configure an instruction setting for the platform configuration instruction to be intercepted on the VM. Accordingly, if a platform configuration instruction is to be executed in any code running on the VM, the configured instruction setting causes the platform configuration instruction to be intercepted and control passed to the hypervisor via a VM exit. In at least one embodiment, the instruction setting may be configured by populating an appropriate data control structure in the virtual machine control structures (VMCS) (e.g., 140) maintained by the hypervisor for the VM. For example, one or more bits in an intercept bitmap (e.g., 148) may be set to indicate that a platform configuration instruction in code that is executing in the VM is to be intercepted and a VM exit is to be taken from the VM before the instruction is invoked.

At 810, the hypervisor initiates a boot process for a guest operating system (OS) (e.g., 116) of the VM. At 812, a guest kernel (e.g., 120) or a secure guest kernel (e.g., 450) allocates memory for HLAT paging structures for the guest OS.

At 814, the guest kernel or secure guest kernel provisions HLAT paging structures of the guest kernel to the VMCS (e.g., 140) associated with the VM (e.g., 110). Provisioning the HLAT paging instructions to the VMCS can include providing a guest physical address (GPA) of the root of the HLAT paging structures to the hypervisor to be stored in the appropriate control structure of the VMCS. The GPA of the root of the HLAT paging structures may be an HLAT pointer (HLATP) (e.g., 144).

At 816, the hypervisor marks the HLAT paging structures as read-only and another limited write permission (e.g., paging-write) to enable writing to certain non-address bits during a page walk. The read-only permissions and limited write permission maybe marked in the EPT page table page table entries (e.g., 650, 652, 654, 656) to apply the permissions to each HLAT paging structure (e.g., 622, 624, 626, 628). It should be noted that, if the VM is implemented with a secure guest kernel, then the HLAT paging structures may be marked in the EPT paging structures (e.g., 432) with read-only permissions for the normal guest kernel (e.g., 420) and marked with read/write permissions in existing legacy paging structures (e.g., 452) of the secure guest kernel (e.g., 450).

Figure 9:
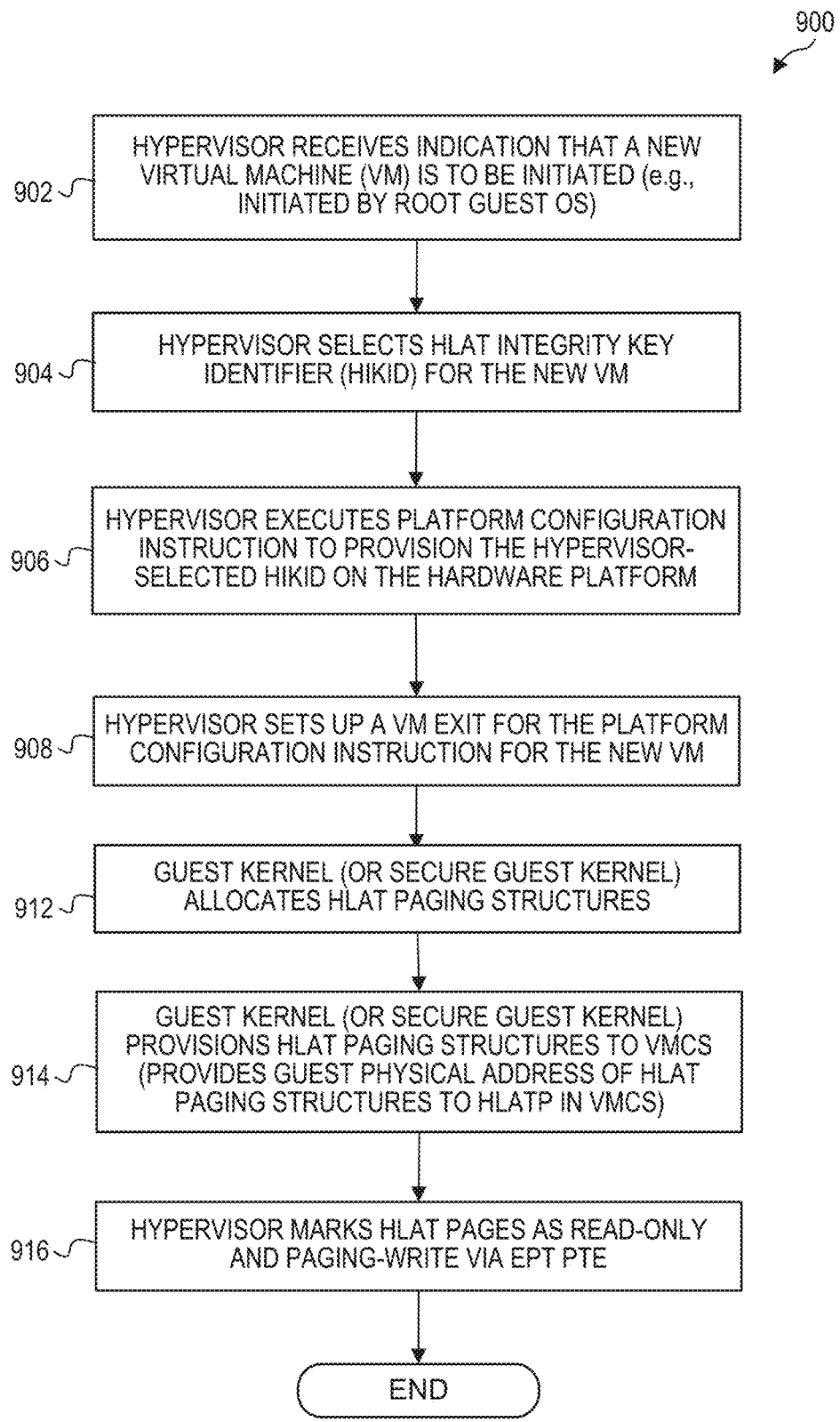
FIG. 9 is a flow diagram of an example process for configuring HLAT and memory integrity for a virtual machine according to at least one embodiment.

FIG. 9 is a flow diagram 900 of example operations to configure HLAT with memory integrity and encryption for a new virtual machine (VM) being instantiated on an executing hypervisor in a computing system according to at least one embodiment. A computing system (e.g., computing system 105) may comprise means such as one or more processors (e.g., 160), for performing the operations. In one example, at least some operations shown in flow diagram 900 may be performed by a hypervisor (e.g., 130, 430).

The operations may begin at 902, when an executing hypervisor receives an indication that a new VM is to be instantiated on a computing system in which a hypervisor (e.g., 130) is already booted, at least one other VM (e.g., 110) is already instantiated, and HLAT with memory integrity and protection has already been configured in the hypervisor and existing VM. In one or more computing systems, the first guest OS to boot may function as a root guest OS (e.g., 116) and facilitate the instantiation of additional VMs (e.g., 210(1), 210(2), 110A, 310(1), 310(2)) on the hypervisor. The root guest OS may coordinate with the hypervisor to instantiate the new VM. In other implementations, the hypervisor may handle the instantiation of a new VM with minimal or no coordination with the root guest OS.

At 904, the hypervisor randomly or deterministically selects a new hypervisor-managed linear address translation integrity key identifier (HIKID) (e.g., 234(1), 234(2), 334) for the new VM to be instantiated by the hypervisor. In at least one embodiment, the new HIKID for the new VM to be instantiated may be different than the first HIKID selected during the boot process of the hypervisor for the first (root) VM.

At 906, the hypervisor executes a platform configuration instruction (e.g., PCONFIG) to provision the hypervisor-selected new HIKID on a hardware platform of the computing system. For example, the platform configuration instruction could provision the new HIKID in memory protection circuitry (e.g., 170) of the processor (e.g., 160) so that, when a memory page of the new VM is marked with the new HIKID, the memory protection circuitry can provide encryption/decryption protection for memory and integrity protection for memory. Provisioning the new HIKID can include setting an integrity mode for the new HIKID (e.g., by storing a certain value in an integrity mode setting associated with the new HIKID or using any other suitable technique). If the integrity mode is set for the new HIKID, integrity protection is enabled for any memory to which the new HIKID is assigned. The HIKID may also be associated with a new encryption key. The new HIKID may be unique to a particular VM of a plurality of VMs already instantiated, or to be instantiated, on the hypervisor. In other implementations, the new HIKID may be unique to a group of VMs (e.g., a tenant, etc.) of a plurality of groups of VMs and may be used to provide HLAT with integrity and encryption protection for each of the VMs in the group. Other HIKIDs may be selected and provisioned for other groups of VMs.

It should be noted that, if the new VM is to be added to a group of VMs for which an HIKID has already been selected, then at 904, instead of selecting a new HIKID, the hypervisor can associate the existing group HIKID with the new VM to be instantiated. The existing group HIKID may be associated with the new VM by storing the existing group HIKID in an appropriate data structure in the VMCS or in other suitable memory. Additionally, in this case, the platform configuration instruction does not need to be invoked since the existing group HIKID is already provisioned on the hardware platform.

At 908, the hypervisor can configure an instruction setting for the platform configuration instruction to be intercepted on the new VM. Accordingly, if a platform configuration instruction is to be executed in any code running on the new VM, the configured instruction setting causes the platform configuration instruction to be intercepted and control passed to hypervisor via a VM exit. In at least one embodiment, the instruction setting may be configured by populating an appropriate data control structure in the virtual machine control structures (VMCS) (e.g., 140A, 240(1), 240(2), 340(1), 340(2)) maintained by the hypervisor for the new VM. For example, one or more bits in an intercept bitmap (e.g., 148) may be set to indicate that a platform configuration instruction in code that is executing in the new VM is to be intercepted and a VM exit is to be taken from the new VM before the instruction is invoked.

At 912, a guest kernel (e.g., 120) or a secure guest kernel (e.g., 450) allocates memory for HLAT paging structures for the guest OS.

At 914, the guest kernel or secure guest kernel provisions HLAT paging structures of the guest kernel to the new VMCS associated with the new VM. Provisioning the HLAT paging instructions to the new VMCS can include providing a guest physical address (GPA) of the root of the HLAT paging structures to the hypervisor to be stored in the appropriate control structure of the new VMCS. The GPA of the root of the HLAT paging structures may be an HLAT pointer (HLATP) (e.g., 144).

At 916, the hypervisor marks the HLAT paging structures as read-only and another limited write permission (e.g., paging-write) to enable writing to certain non-address bits during a page walk. The read-only permissions and limited write permission maybe marked in the EPT page table page table entries (e.g., 650, 652, 654, 656) to apply the permissions to each HLAT paging structure (e.g., 622, 624, 626, 628). It should be noted that, if the new VM is implemented with a secure guest kernel, then the HLAT paging structures may be marked in the EPT paging structures with read-only permissions for the normal guest kernel (e.g., 420) of the new VM and marked with read/write permissions in existing legacy paging structures (e.g., 452) of the secure guest kernel (e.g., 450) of the new VM.

Figure 10:
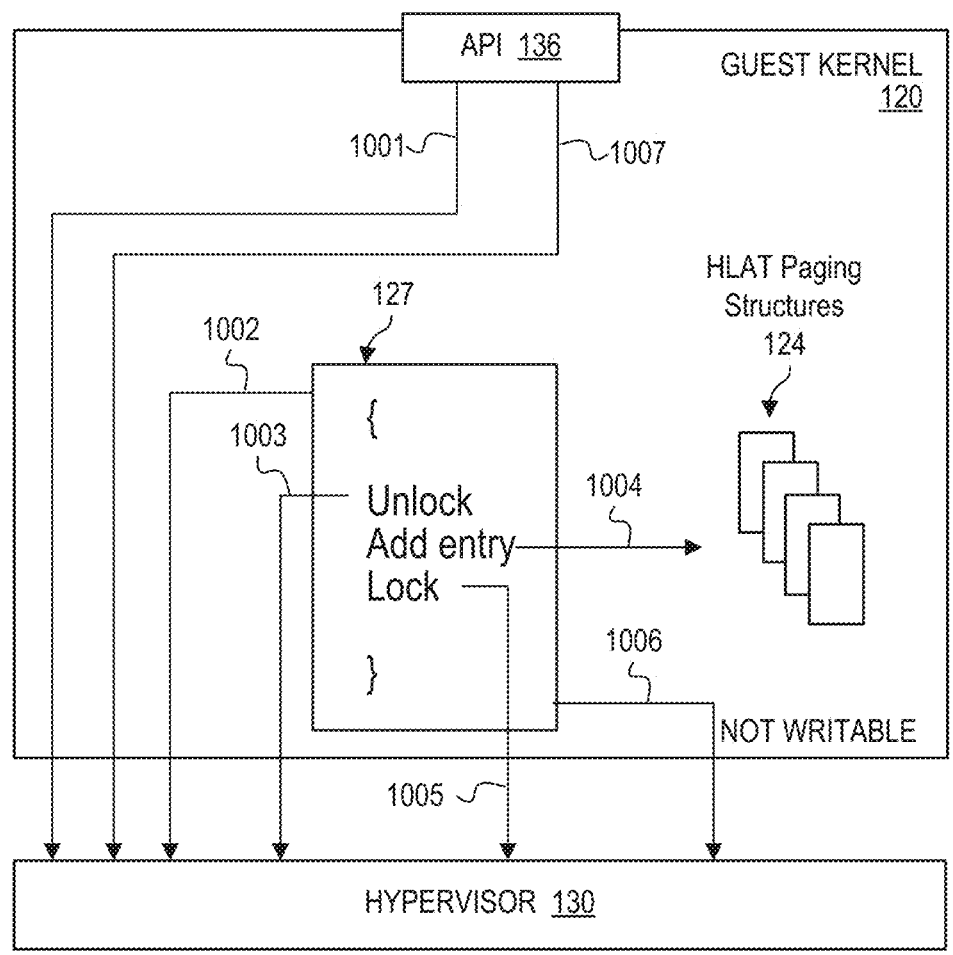
FIG. 10 is a block diagram of an example process in a guest kernel of a virtual machine to modify HLAT paging structures according to at least one embodiment.

FIG. 10 is a block diagram illustrating an example process in a guest kernel 120 of virtual machine (VM) 110 to modify HLAT paging structures 124 according to at least one embodiment. In guest kernel 120, an example portion of paging structures update code 127 and API 136 are shown. The process of FIG. 10 may be implemented when HLAT with integrity and encryption is implemented in a computing system, such as computing system 105, in which a guest kernel does not include a secure guest kernel to securely allocate and map HLAT paging structures.

Paging structures update code 127 may be executed to temporarily unlock HLAT paging structures 124 and to modify the appropriate HLAT paging structures 124. For example, HLAT paging structures 124 may need to be modified by adding a new entry in an existing HLAT paging structure, by modifying an existing entry in an existing HLAT paging structure, or by allocating a new HLAT paging structure and adding a new entry in the new HLAT paging structure. Such modifications may be needed when guest kernel 120 allocates new memory that is to be HLAT-protected, for example, if the allocated memory includes code and data pages for sensitive OS modules, OS security agents, kernel extensions, etc. Hypervisor 130 can designate paging structures update code 127 as non-executable until memory that is to be HLAT-protected is allocated, and the allocated memory needs to be mapped via HLAT paging structures.

Guest kernel 120 may invoke API 136 to communicate with hypervisor 130 to enable the mapping of HPAs to GPAs in HLAT paging structures 124. When guest kernel 120 allocates memory that is to be HLAT-protected, then at 1001, guest kernel 120 can communicate with hypervisor 130 to request that hypervisor 130 change the paging structures update code 127 from non-executable to executable. Guest kernel 120 can then invoke the executable code 127.

When paging structures update code 127 is executed, at 1002, the code can communicate a request to hypervisor 130 to unlock the HLAT paging structures 124. Paging structures update code 127 can provide the hypervisor 130 with the GPA(s) of the HLAT paging structure(s) to be unlocked. Unlocking the HLAT paging structures can be achieved by the hypervisor 130 marking the EPT PTEs (e.g., 650, 652, 654, and/or 656) for physical pages corresponding to the provided GPAs with read/write permissions. Once the hypervisor 130 unlocks HLAT paging structure(s) corresponding to the GPA(s) provided by paging structures update code 127, then the unlocked HLAT paging structure(s) can be modified. For example, at 1004, a new entry can be added to one or more of the unlocked HLAT paging structure(s) 124. Once the modification of the HLAT paging structure(s) is completed, paging structures update code 127 can communicate a request to hypervisor 130 to lock the HLAT paging structure(s) corresponding to GPA(s) provided in the request. Locking the HLAT paging structures can be achieved by the hypervisor 130 marking the EPT PTEs (e.g., 650, 652, 654, and/or 656) for physical pages corresponding to the provided GPAs with read-only permission.

Once paging structures update code 127 has finished executing and the HLAT paging structures are marked with read-only permission, then at 1007, guest kernel 120 can communicate a request to hypervisor 130 to change the permissions of the paging structures update code 127 from executable back to non-executable. Paging structures update code 127 may remain in a non-executable permission state until another kernel memory allocation occurs and HLAT paging structures need further modification.

Figure 11:
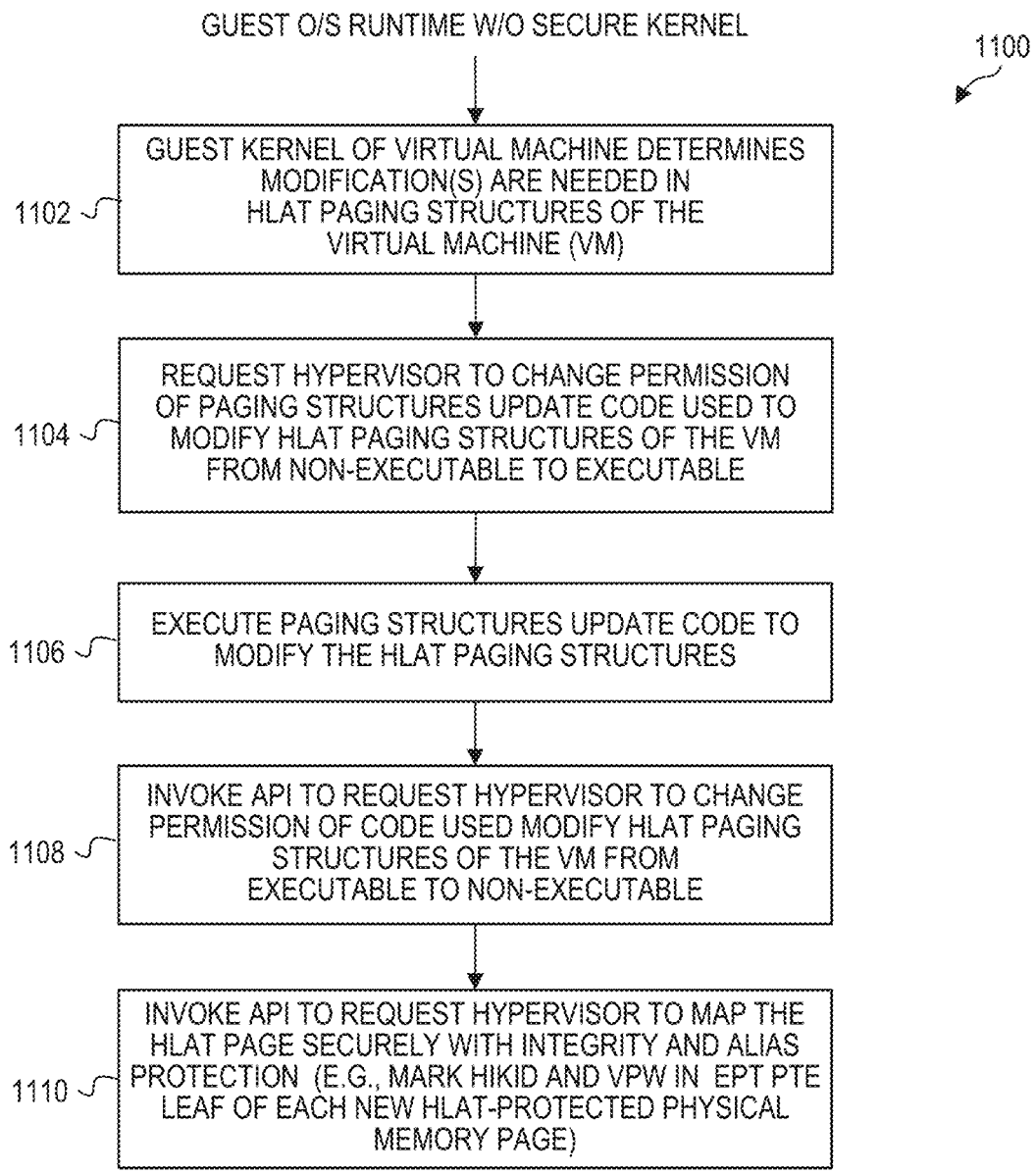
FIG. 11 is a flow diagram of an example process associated with securely mapping pages of memory for a virtual machine according to at least one embodiment.
Figure 12:
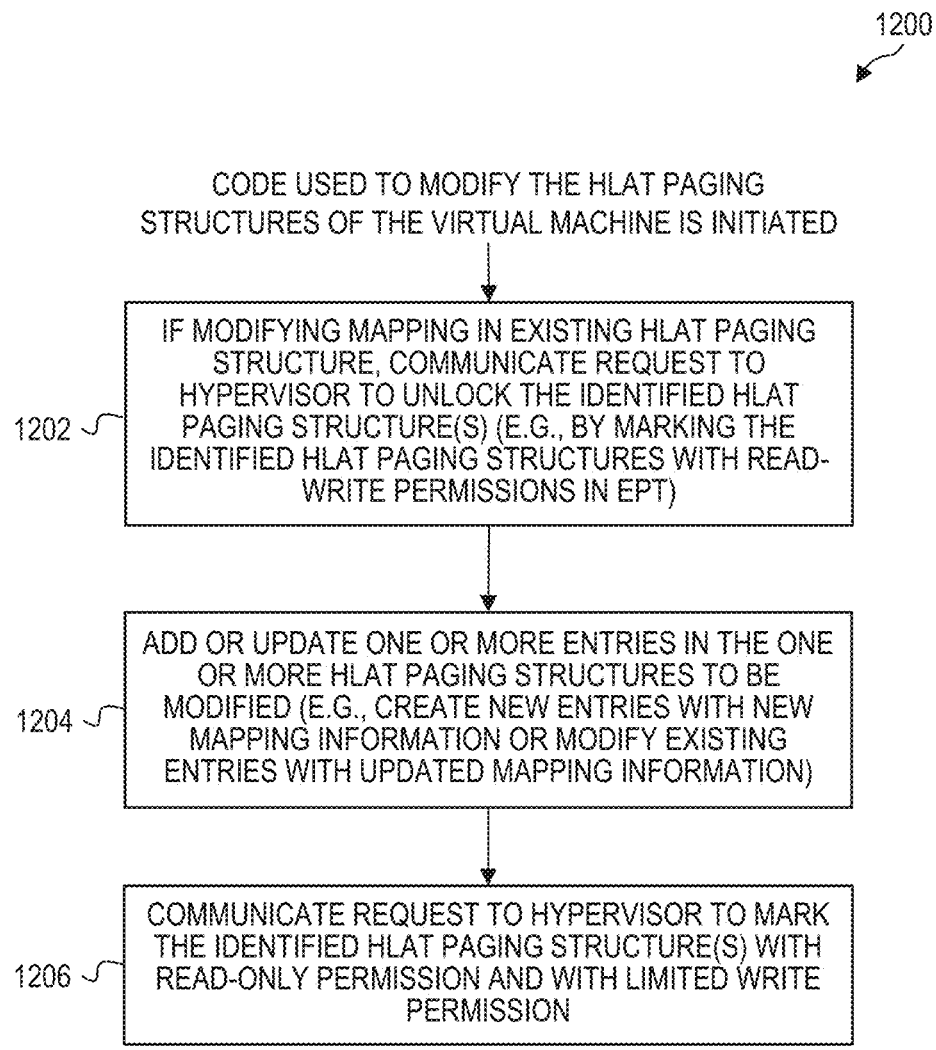
FIG. 12 is a flow diagram of an example process associated with modifying HLAT paging structures according to at least one embodiment.

FIGS. 11-12 are flow diagrams of example operations associated with the process shown and described with reference to FIG. 10. FIG. 11 is a flow diagram 1100 of example operations during a guest operating system runtime to securely map pages of memory via HLAT with integrity and encryption for a virtual machine according to at least one embodiment. A computing system (e.g., computing system 105) may comprise means such as one or more processors (e.g., 160), for performing the operations. In one example, at least some operations shown in flow diagram 1100 may be performed by a guest kernel (e.g., 120, 220(1), 220(2), 1020) using an API (e.g., 136), secure allocation/mapping code (e.g., 125), and/or paging structures update code (e.g., 127).

The operations may begin at 1102, when the guest kernel of a virtual machine (VM) determines that modifications are needed in the HLAT paging structures of the VM, such as HLAT paging structure entry additions or updates, which could potentially include HLAT paging structure additions. The guest kernel may determine that such modifications are needed when allocating new kernel memory or other memory selected for HLAT protection.

At 1104, the guest kernel can send a request to the hypervisor to toggle the permission of code (e.g., paging structures update code 127) used to modify HLAT paging structures of the VM from non-executable to executable. In at least one embodiment, an API may be invoked to send this request to the hypervisor.

Once the hypervisor changes the code used to modify the HLAT paging structures from non-executable to executable, at 1106, the guest kernel can run the executable code to modify the HLAT paging structures as needed. For example, a new entry (or entries) in one or more of the HLAT paging structures may be added or updated. In another example, memory for a new HLAT paging structure may be allocated and a new entry may be added to the new HLAT paging structure.

Once the HLAT paging structure(s) are appropriately modified, at 1108, the guest kernel can send a request to the hypervisor to toggle the permission of code used to modify HLAT paging structures of the VM from executable back to non-executable. In at least one embodiment, an API may be invoked to send this request to the hypervisor.

At 1110, the guest kernel can send a request to the hypervisor to map the HLAT-protected pages securely with integrity and encryption. The request can cause the hypervisor to assign an appropriate HIKID to each new HLAT-protected page of memory (e.g., for added entries corresponding to a new physical memory page). For example, the hypervisor can mark the EPT PTE leaf for each new HLAT-protected physical memory page with an HIKID selected and provisioned for the VM. In one or more other designated bits of the EPT PTE leaf, the hypervisor can also store an appropriate access permission setting (e.g., read/write, read-only) and an appropriate setting to prevent an alias attack (e.g., verify paging-write (VPW)).

FIG. 12 is a flow diagram 1200 of example operations during a guest operating system runtime to modify HLAT paging structures of a guest kernel of a virtual machine (VM). A computing system (e.g., computing system 105) may comprise means such as one or more processors (e.g., 160), for performing the operations. In one example, at least some operations shown in flow diagram 1200 may be performed by paging structures update code (e.g., 127) running in a guest kernel (e.g., 120, 220(1), 220(2)) of a VM (e.g., 110, 110A, 210(1), 210(2), 310(1), 310(2)). One or more of the operations of flow diagram 1200 may be performed at 1106 of flow diagram 1100 in FIG. 11.

If a modification is to be made to an existing HLAT paging structure, the code (e.g., paging structures update code 127) can communicate a request to the hypervisor to unlock the identified HLAT paging structure(s) to be modified. Hypervisor can do this by marking the EPT PTE leaf of each identified HLAT paging structure(s) to be modified as read/write.

At 1204, the code can perform the needed modification by adding or updating one or more entries in the one or more HLAT paging structures to be modified. The code may also allocate memory for one or more new HLAT paging structures, if needed, and create one or more new entries in the new HLAT paging structure(s). New entries may be added with new mapping information (e.g., new GPA), and existing entries may be updated with different mapping information (e.g., different GPA).

Once the HLAT paging structures have been modified, at 1206, the code can communicate a request to the hypervisor to lock the identified HLAT paging structure(s) that were previously unlocked by the hypervisor. The hypervisor can do this by marking the EPT PTE leaf of each identified HLAT paging structure(s) to be modified as read-only (and possibly with a limited write permission as well).

Figure 13:
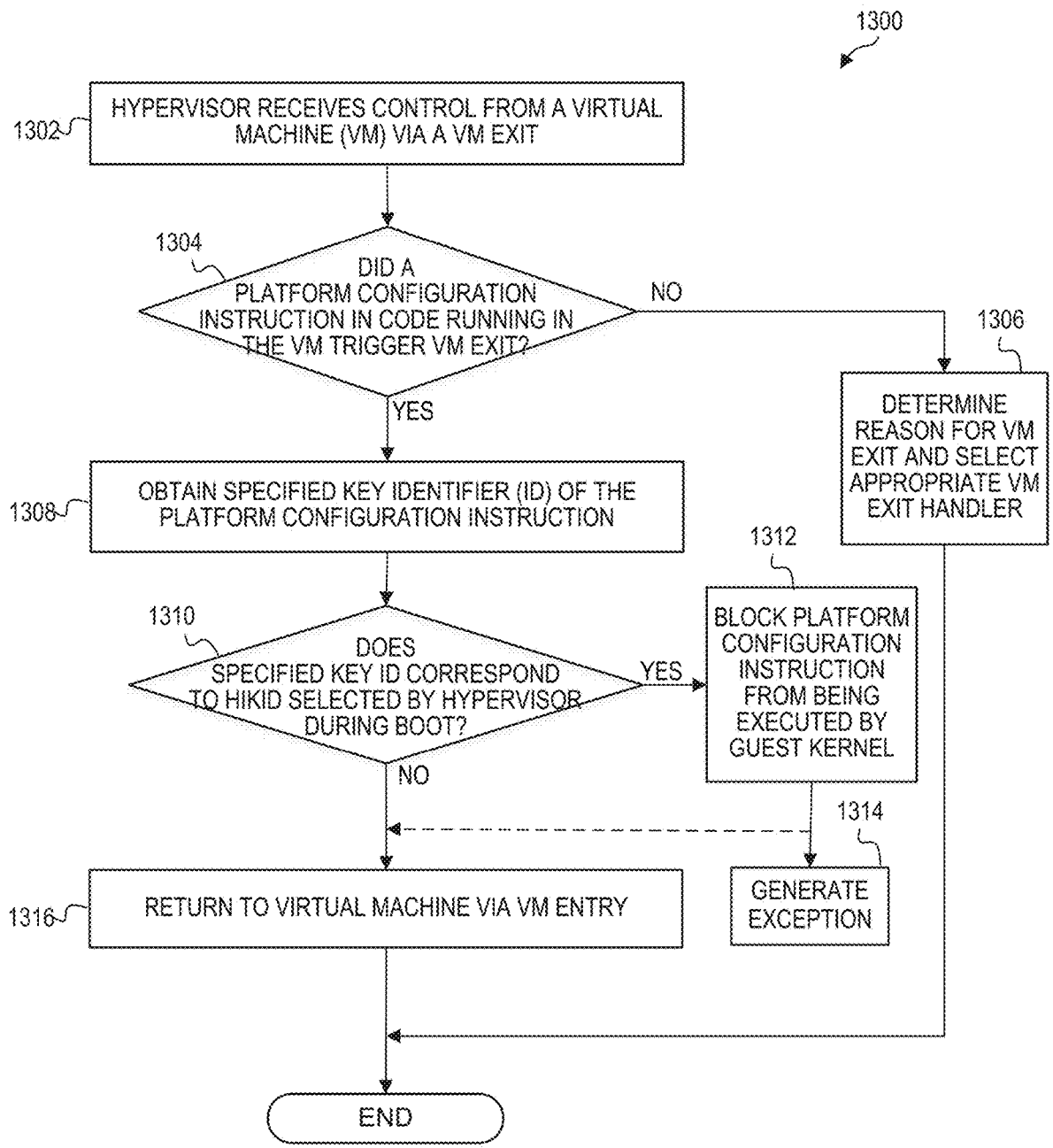
FIG. 13 is a flow diagram of an example process associated with an interception of a platform configuration instruction in a guest kernel according to at least one embodiment.

FIG. 13 is a flow diagram of an example process associated with an interception of a platform configuration instruction in a guest kernel according to at least one embodiment. A computing system (e.g., computing system 105) may comprise means such as one or more processors (e.g., 160), for performing the operations. In one example, at least some operations shown in flow diagram 1300 may be performed by a hypervisor (e.g., 130, 430) of a VM (e.g., 110, 110A, 210(1), 210(2), 310(1), 310(2)).

At 1302, a hypervisor receives control from a virtual machine (VM) via a VM exit. At 1304, a determination is made as to whether the VM exit was triggered by a platform configuration instruction. If the VM exit was not triggered by a platform configuration instruction, then at 1306, the reason for the VM exit is determined and an appropriate VM exit handler is selected.

If it is determined at 1304 that a platform configuration instruction triggered the VM exit, then at 1308, key identifier specified in the platform configuration instruction is obtained. At 1310, a determination is made as to whether the specified key identifier matches the HIKID of the VM from which the VM exit was taken. If a determination is made that the key identifier matches the HIKID of the VM, then at 1312, the hypervisor blocks the platform configuration instruction from being executed by the guest kernel. Depending on the implementation, control may be returned to the VM at 1316 to continue running, or an exception may be generated at 1314.

If it is determined at 1310 that the key ID does not match the HIKID of the VM, then at 1316, then control may be returned to the VM at 1316 to continue running.

Figure 14:
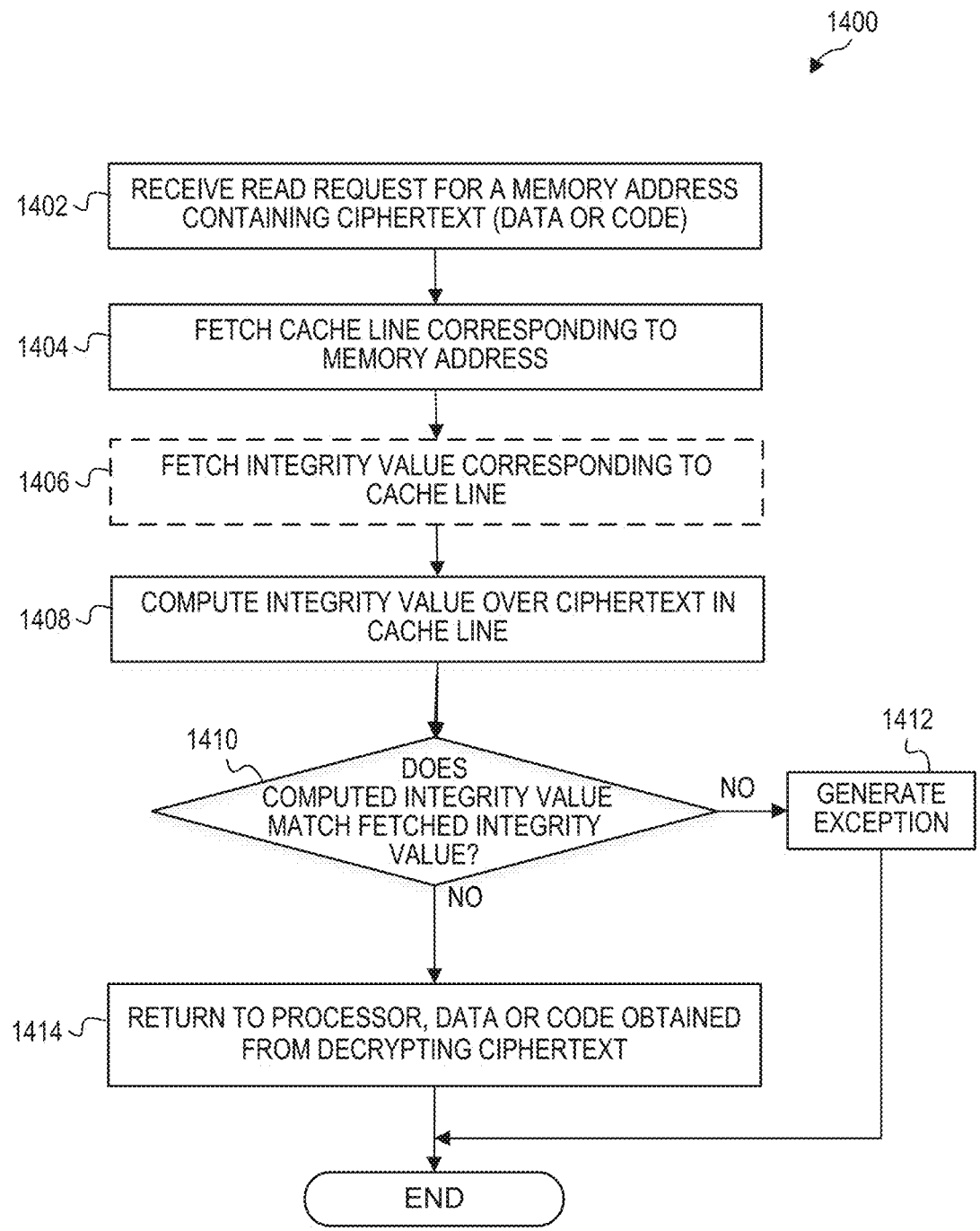
FIG. 14 is a flow diagram of an example process for validating integrity of memory according to at least one embodiment.

FIG. 14 is a flow diagram of an example process for validating integrity of HLAT-protected memory according to at least one embodiment. A computing system (e.g., computing system 105) may comprise means such as one or more processors (e.g., 160), for performing the operations. In one example, at least some operations shown in flow diagram 1400 may be performed by memory protection circuitry 170.

At 1402, the processor may receive a read request for a memory address in HLAT-protected memory containing ciphertext (e.g., encrypted data or encrypted code). The read request may come from the guest kernel, or the guest OS, for example.

At 1404, the cache line corresponding to the memory address can be fetched. Depending on the implementation, an integrity value (e.g., message authentication code) may be stored in the fetched cache line. In other implementations, the integrity value may be stored in another location in memory and, at 1406, the integrity value for the fetched cache line may be fetched from the other location.

At 1408, the memory protection circuitry can compute an integrity value over the ciphertext in the cache line. At 1410, the computed integrity value is compared to the fetched integrity value. If the computed integrity value does not match the fetched integrity value, then at 1412, an exception is generated.

If at 1410, the computed integrity value matches the fetched integrity value, then at 1414, a key table (e.g., in the memory protection circuitry or other suitable hardware or software storage) may be used to obtain an encryption key associated with the HIKID that is assigned to the memory page containing the fetched cache line. The ciphertext can be decrypted using the encryption key and the decrypted data or code may be returned to the requesting entity (e.g., guest kernel or guest OS).

FIGS. 15-18 described below detail exemplary architectures and systems to implement embodiments of hypervisor-managed linear address translation and memory integrity described above. In some embodiments, one or more hardware components and/or instructions described above are emulated as detailed below or implemented as software modules. Other computer architecture designs known in the art for processors, mobile devices, computing systems, and components thereof may also (or alternatively) be used. Generally, suitable computer architectures for embodiments disclosed (e.g., computing system 105, processor 160, logical cores 162A-162B, memory 180, etc.) herein can include, but are not limited to, configurations illustrated in the below FIGS. 15-18.

Figure 15:
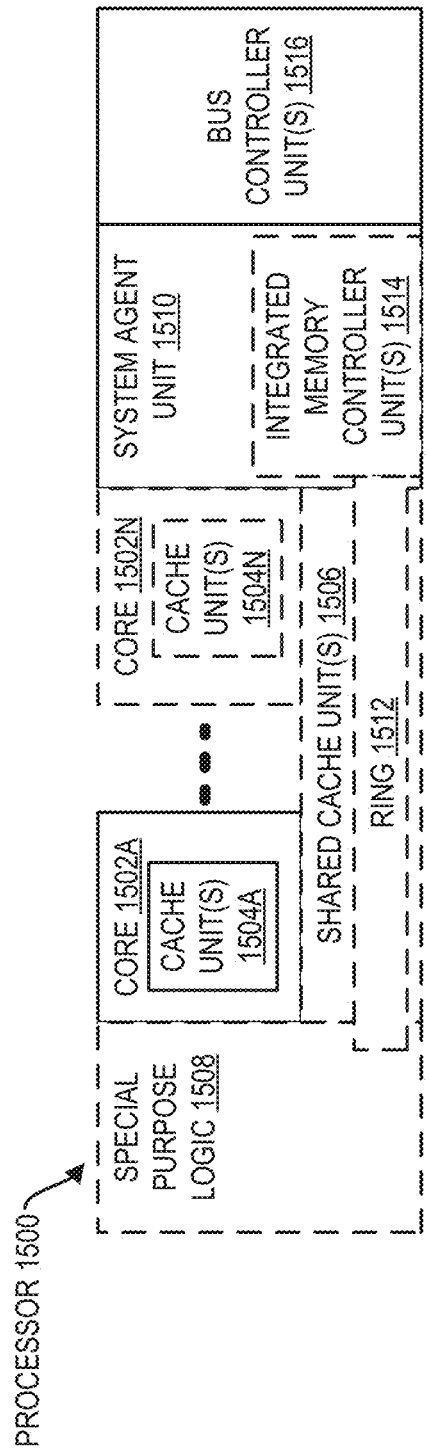
FIG. 15 is a block diagram of a processor that may have more than one core, may have an integrated memory controller, and may have integrated graphics according to embodiments of the present disclosure.

FIG. 15 is a block diagram of a processor 1500 that may have more than one core, may have an integrated memory controller, and may have integrated graphics according to one or more embodiments of this disclosure. Processor 1500 is an example of a type of hardware device that can be used in connection with the implementations shown and described herein (e.g., processor 160). The solid lined boxes in FIG. 15 illustrate a processor 1500 with a single core 1502A, a system agent unit 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508. Processor 1500 and its components (e.g., cores 1502A-N, cache unit(s) 1504A-N, shared cache unit(s) 1506, etc.) represent example architecture that could be used to implement processor 160 and at least some of its respective components.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of executing the same instruction set, while others may be capable of executing only a subset of that instruction set or a different instruction set.

Figure 16A:
FIG. 16A is a block diagram illustrating both an exemplary in-order pipeline and an exemplary register renaming, out-of-order issue/execution pipeline in accordance with at least one embodiment.
Figure 16B:
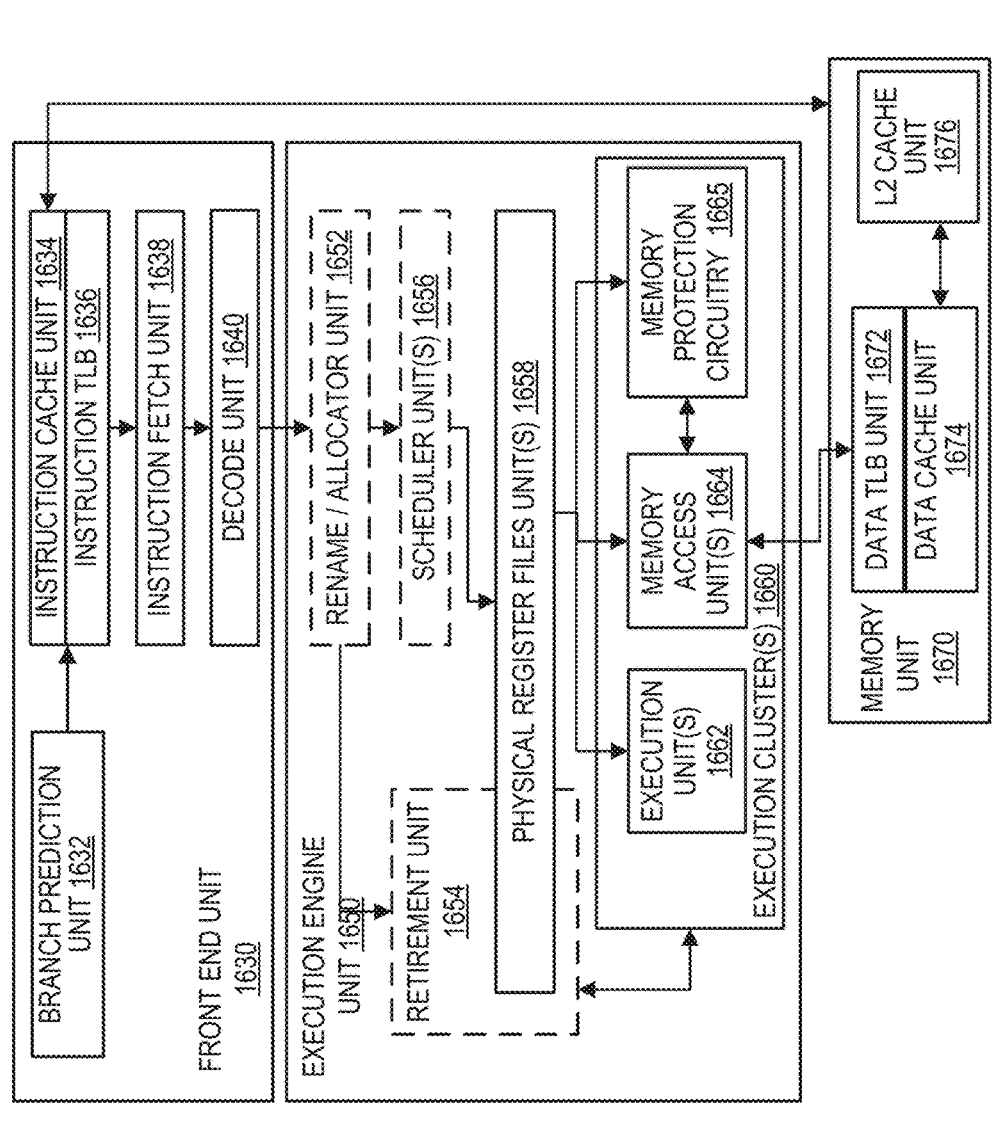
FIG. 16B is a block diagram illustrating both an exemplary embodiment of an in-order architecture core and an exemplary register renaming, out-of-order issue/execution architecture core to be included in a processor in according to at least one embodiment.

FIG. 16A is a block diagram illustrating both an exemplary in-order pipeline and an exemplary register renaming, out-of-order issue/execution pipeline according to one or more embodiments of this disclosure. FIG. 16B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 930 coupled to an execution engine unit 1650, and both are coupled to a memory unit 1670. Processor core 1690 and memory unit 1670 are examples of the types of hardware that can be used in connection with the implementations shown and described herein (e.g., logical cores 162A-162B, memory 180). The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like. In addition, processor core 1690 and its components represent example architecture that could be used to implement logical processors and at least some of their respective components.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. Additionally, memory protection circuitry 1665 may be coupled to memory access unit(s) 1664 in one or more embodiments. Memory protection circuitry 1665 may be the same or similar to memory protection circuitry (e.g., 170) previously described herein to enable integrity and possibly encryption for HLAT protected memory pages. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch unit 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the scheduling stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 17:
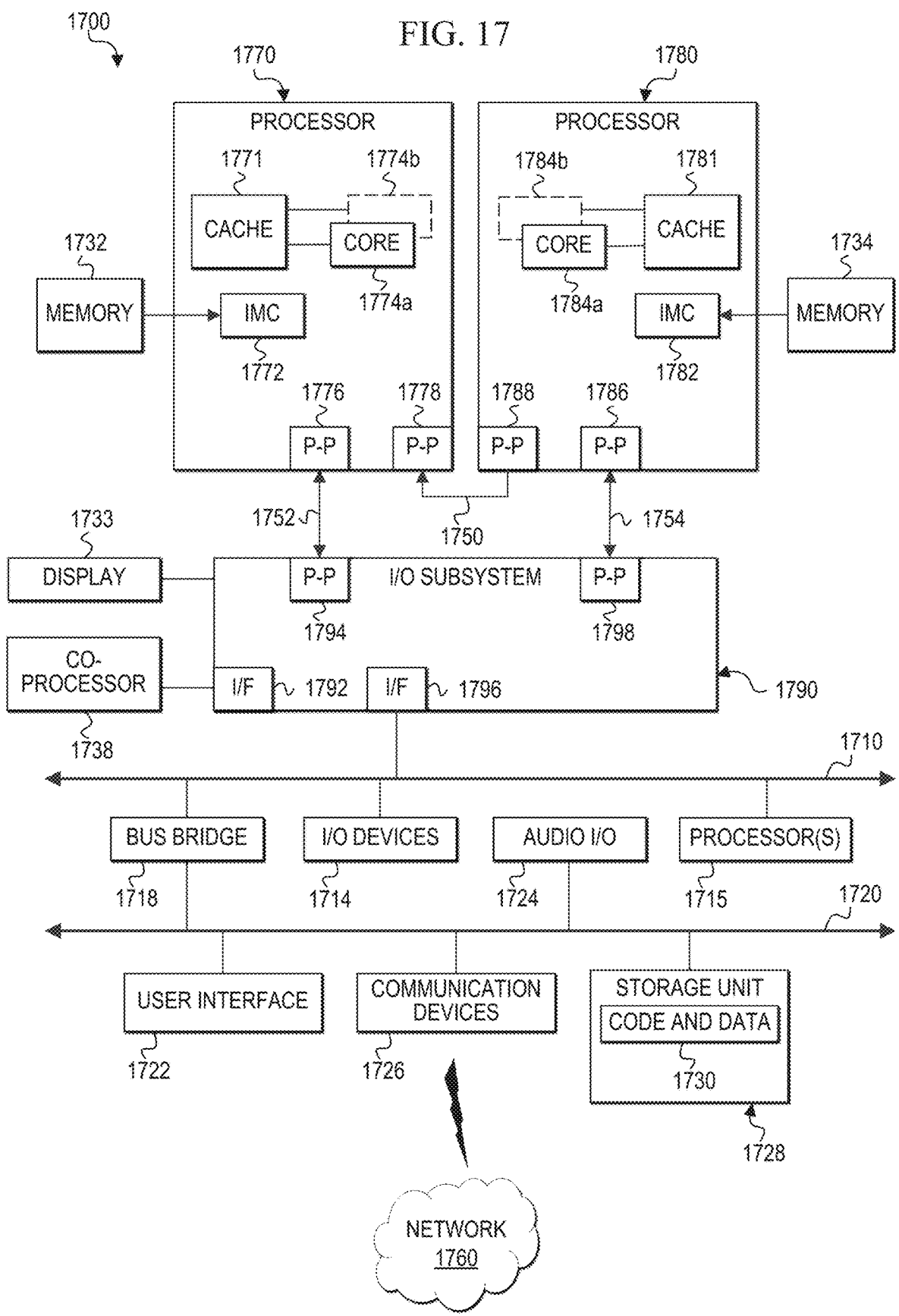
FIG. 17 is a block diagram of an example computer architecture according to at least one embodiment.

FIG. 17 illustrates a computing system 1700 that is arranged in a point-to-point (PtP) configuration according to an embodiment. In particular, FIG. 17 shows a system where processors, memory, and input/output devices are interconnected by a number of point-to-point interfaces. Generally, one or more of the computing systems or computing devices described herein (e.g., computing system 105) may be configured in the same or similar manner as computing system 1700 with appropriate hardware, firmware, and/or software to implement HLAT with integrity (and possibly encryption) protection, as disclosed herein.

Processors 1770 and 1780 may be implemented as single core processors 1774*a* and 1784*a* or multi-core processors 1774*a*-1774*b* and 1784*a*-1784*b*. Processors 1770 and 1780 may each include a cache 1771 and 1781 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1700. Moreover, processors 1770 and 1780 are examples of the types of hardware that can be used in connection with the implementations shown and described herein (e.g., processor 160).

Processors 1770 and 1780 may also each include integrated memory controller logic (MC) 1772 and 1782 to communicate with memory elements 1732 and 1734, which may be portions of main memory locally attached to the respective processors. In alternative embodiments, memory controller logic 1772 and 1782 may be discrete logic separate from processors 1770 and 1780. Memory elements 1732 and/or 1734 may store various data to be used by processors 1770 and 1780 in achieving operations and functionality outlined herein.

Processors 1770 and 1780 may be any type of processor, such as those discussed in connection with other figures. Processors 1770 and 1780 may exchange data via a point-to-point (PtP) interface 1750 using point-to-point interface circuits 1778 and 1788, respectively. Processors 1770 and 1780 may each exchange data with an input/output (I/O) subsystem 1790 via individual point-to-point interfaces 1752 and 1754 using point-to-point interface circuits 1776, 1786, 1794, and 1798. I/O subsystem 1790 may also exchange data with a high-performance graphics circuit 1738 via a high-performance graphics interface 1739, using an interface circuit 1792, which could be a PtP interface circuit. In one embodiment, the high-performance graphics circuit 1738 is a special-purpose processor, such as, for example, a high-throughput MIC processor, a network or communication processor, compression engine, graphics processor, GPGPU, embedded processor, or the like. I/O subsystem 1790 may also communicate with a display 1733 for displaying data that is viewable by a human user. In alternative embodiments, any or all of the PtP links illustrated in FIG. 17 could be implemented as a multi-drop bus rather than a PtP link.

I/O subsystem 1790 may be in communication with a bus 1710 via an interface circuit 1796. Bus 1710 may have one or more devices that communicate over it, such as a bus bridge 1718, I/O devices 1714, and one or more other processors 1715. Via a bus 1720, bus bridge 1718 may be in communication with other devices such as a user interface 1722 (such as a keyboard, mouse, touchscreen, or other input devices), communication devices 1726 (such as modems, network interface devices, or other types of communication devices that may communicate through a computer network 1760), audio I/O devices 1724, and/or a data storage device 1728. Data storage device 1728 may store code and data 1730, which may be executed by processors 1770 and/or 1780. In alternative embodiments, any portions of the bus architectures could be implemented with one or more PtP links.

Program code, such as code 1730, may be applied to input instructions to perform the functions described herein and generate output information. The output information may be applied to one or more output devices, in known fashion. For purposes of this application, a processing system may be part of computing system 1700 and includes any system that has a processor, such as, for example; a digital signal processor (DSP), a microcontroller, an application specific integrated circuit (ASIC), or a microprocessor.

The program code (e.g., 1730) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language. Program code may also include code for running a hypervisor (e.g., 130, 430) and a virtual machine (e.g., 110, 110A, 210(1), 210(2), 310(1), 310(2)), 410).

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 17 is a schematic illustration of a computing system that may be utilized to implement various embodiments discussed herein. It will be appreciated that various components of the system depicted in FIG. 17 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
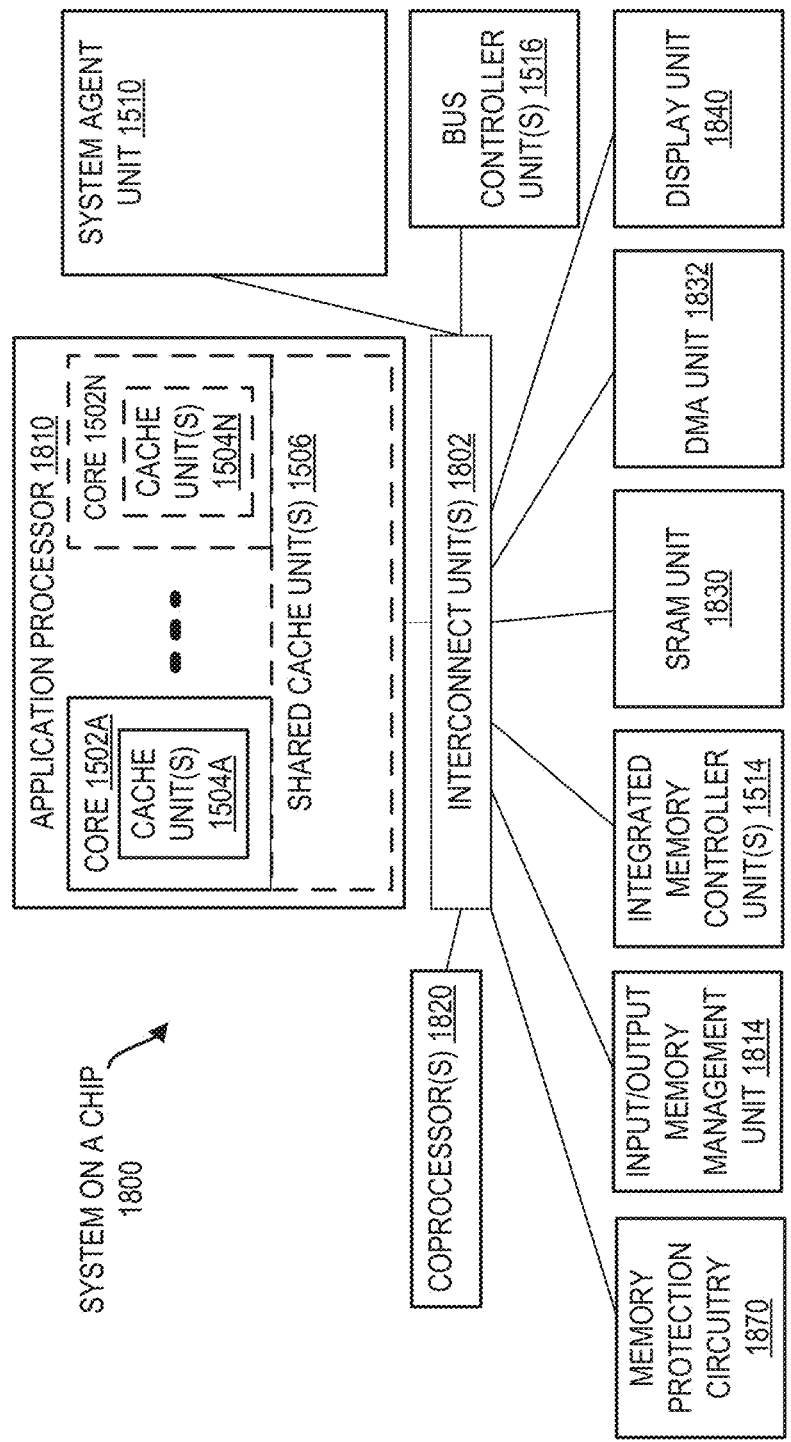
FIG. 18 is a block diagram of an example computer architecture for a system-on-a-chip according to at least one embodiment.

Referring now to FIG. 18, shown is a block diagram of a system-on-a-chip (SoC) 1800 in accordance with at least one embodiment of the present disclosure. Also, dashed lined boxes are optional features on more advanced SoCs. In FIG. 18, an interconnect unit(s) 1802 is coupled to: an application processor 1810 which includes a set of one or more cores 1502A-1502N with cache units 1504A-1504N (which may be coupled to a RAD prefetcher as disclosed herein), and shared cache unit(s) 1506; a system agent unit 1510; a bus controller unit(s) 1516; an integrated memory controller unit(s) 1514; a set or one or more coprocessors 1820 which may include integrated graphics logic, an image processor, an audio processor, and a video processor; an static random access memory (SRAM) unit 1830; a direct memory access (DMA) unit 1832; memory protection circuitry 1870 (which may be the same or similar to memory protection circuitry 170) and a display unit 1840 for coupling to one or more external displays. In one embodiment, the coprocessor(s) 1820 includes a special-purpose processor, such as, for example, a network or communication processor, compression engine, GPGPU, a high-throughput MIC processor, embedded processor, or the like.

Figure 19:
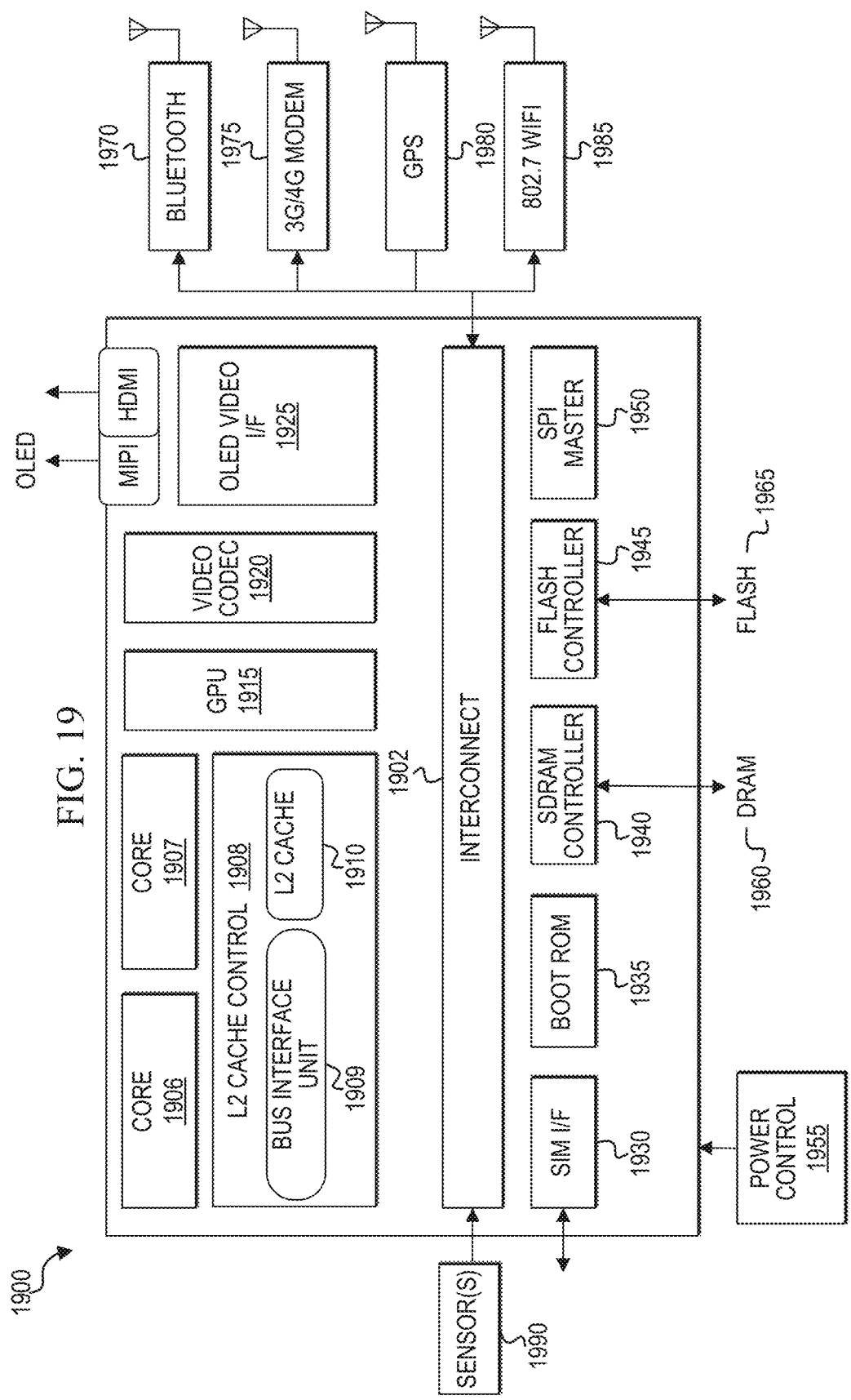
FIG. 19 is a simplified block diagram associated with an example ARM ecosystem system on chip (SOC) according to at least one embodiment.

Turning to FIG. 19, FIG. 19 is a simplified block diagram associated with an example ARM ecosystem SOC 1900 that may be used in one or more embodiments of the present disclosure. At least one example implementation of the present disclosure can include hypervisor-managed linear address translation with integrity protection (and possibly encryption) discussed herein and an ARM component. For example, in at least some embodiments, computing system 105, shown and described herein, could be configured in the same or similar manner ARM ecosystem SOC 1900. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 19, ARM ecosystem SOC 1900 may include multiple cores 1906-1907, an L2 cache control 1908, a bus interface unit 1909, an L2 cache 1910, a graphics processing unit (GPU) 1915, an interconnect 1902, a video codec 1920, and an organic light emitting diode (OLED) I/F 1925, which may be associated with mobile industry processor interface (MIPI)/high-definition multimedia interface (HDMI) links that couple to an OLED display.

ARM ecosystem SOC 1900 may also include a subscriber identity module (SIM) I/F 1930, a boot read-only memory (ROM) 1935, a synchronous dynamic random access memory (SDRAM) controller 1940, a flash controller 1945, a serial peripheral interface (SPI) master 1950, a suitable power control 1955, a dynamic RAM (DRAM) 1960, flash 1965, and one or more sensors 1990. In at least one embodiment, memory protection circuitry 170, which was shown and described in FIG. 1, may be provisioned on the path to DRAM 1960. In addition, one or more example embodiments include one or more communication capabilities, interfaces, and features such as instances of Bluetooth™ 1970, a 3G modem 1975, a global positioning system (GPS) 1980, and an 802.11 Wi-Fi 1985.

In operation, the example of FIG. 19 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

With regard to this specification generally, unless expressly stated to the contrary, use of the phrases 'at least one of' and 'one or more of' refers to any combination of the named elements, conditions, activities, messages, entries, paging structures, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, computing system 105 using the approaches disclosed herein for providing integrity protection and optionally, encryption protection, of the HLAT-protected memory. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

OTHER NOTES AND EXAMPLES

The following examples pertain to embodiments in accordance with this specification. The system, apparatus, method, and machine readable storage medium embodiments can include one or a combination of the following examples.

The following examples pertain to embodiments in accordance with this specification. Example A1 provides an apparatus that includes a processor configured to be communicatively coupled to a memory and the processor is to execute instructions of a hypervisor to: select a first key identifier for a first virtual machine; invoke a first platform configuration instruction to cause the processor to set an integrity mode for the first key identifier; instantiate the first virtual machine including a first guest kernel, the first guest kernel to allocate a plurality of hypervisor-managed linear address translation (HLAT) paging structures to be used to translate a guest virtual address (GVA) to a guest physical address (GPA) of a first memory page allocated for the first virtual machine; mark the plurality of HLAT paging structures with read-only permission; and assign the first key identifier to the first memory page.

Example A2 comprises the subject matter of Example A1, and the processor is to execute the instructions of the hypervisor further to configure an instruction setting to cause a second platform configuration instruction contained in program code to be executed in the first virtual machine to be intercepted prior to being invoked.

Example A3 comprises the subject matter of Example A2, and the processor is to execute the instructions of the hypervisor further to receive control from the first virtual machine in response to the second platform configuration instruction being intercepted, and block an execution of the second platform configuration instruction based on a determination that the second platform configuration instruction included the first key identifier.

Example A4 comprises the subject matter of any one of Examples A1-A3, and the processor is to execute the instructions of the hypervisor further to, in response to receiving one or more requests from the first virtual machine, temporarily mark the plurality of HLAT paging structures with write permission and temporarily change an execute permission of paging structures update code from non-executable to executable, and the processor is to execute the paging structures update code in the first virtual machine to update the plurality of HLAT paging structures.

Example A5 comprises the subject matter of Example A4, and to update the plurality of HLAT paging structures is to include adding mapping information in the HLAT paging structures to enable the processor to translate the GVA to the GPA of the first memory page.

Example A6 comprises the subject matter of any one of Examples A1-A5, and the processor is to execute the instructions of the hypervisor further to select a second key identifier for a second virtual machine, invoke a third platform configuration instruction to cause the processor to set the integrity mode for the second key identifier, in response to receiving a pointer to a second plurality of HLAT paging structures to be used to translate a second GVA to a second GPA of a second memory page allocated for the second virtual machine, mark the second plurality of HLAT paging structures with the read-only permission, and assign the second key identifier to the second memory page.

Example A7 comprises the subject matter of Example A6, and the processor is to execute the instructions of the hypervisor further to associate the first key identifier with a first plurality of virtual machines running on the hypervisor, and associate the second key identifier with a second plurality of virtual machines running on the hypervisor.

Example A8 comprises the subject matter of any one of Examples A1-A7, and the processor is to execute the instructions of the hypervisor further to mark the plurality of HLAT paging structures with limited write permission to allow one or more metadata bits in page table entries of the plurality of HLAT paging structures to be modified during a page walk of the HLAT paging structures.

Example A9 comprises the subject matter of any one of Examples A1-A8, and the processor is to execute the instructions of the hypervisor further to allocate extended page table (EPT) paging structures to be used to translate the GPA to a host physical address (HPA) of the first memory page, and to assign the first key identifier to the first memory page is to store the first key identifier in designated bits of a page table entry leaf in a page table of the EPT paging structures, and the page table entry leaf is to include other bits containing the HPA.

Example A10 comprises the subject matter of Example A9, and the first key identifier is to be stored in the designated bits of the page table entry leaf in the page table of the EPT paging structures in response to a request from the first guest kernel running in the virtual machine or from a secure guest kernel running in the virtual machine.

Example A11 comprises the subject matter of any one of Examples A1-A10, and the processor includes memory protection circuitry to, in response to determining that the integrity mode is set for the first key identifier, generate one or more integrity values for data or code to be stored in the first memory page.

Example C1 provides a machine readable storage medium including instructions stored thereon that, when executed by a processor, cause the processor to perform operations of a hypervisor comprising selecting a first key identifier for a first virtual machine, invoking a first platform configuration instruction to cause the processor to set an integrity mode for the first key identifier, instantiating the first virtual machine including a first guest kernel to allocate a plurality of hypervisor-managed linear address translation (HLAT) paging structures to be used to translate a guest virtual address (GVA) to a guest physical address (GPA) of a first memory page in memory, marking the plurality of HLAT paging structures with read-only permission, and assigning the first key identifier to the first memory page.

Example C2 comprises the subject matter of Example C1, and the operations of the hypervisor to be performed by the processor further comprise configuring an instruction setting to cause a second platform configuration instruction contained in program code to be executed in the first virtual machine to be intercepted prior to being invoked.

Example C3 comprises the subject matter of Example C2, and the operations of the hypervisor to be performed by the processor further comprise receiving control from the first virtual machine in response to the second platform configuration instruction being intercepted, and blocking an execution of the second platform configuration instruction based on a determination that the second platform configuration instruction included the first key identifier.

Example C4 comprises the subject matter of any one of Examples C1-C3, and the operations of the hypervisor to be performed by the processor further comprise, in response to receiving one or more requests from the first virtual machine, marking the plurality of HLAT paging structures with write permission and changing an execute permission of paging structures update code from non-executable to executable, and the processor is to execute the paging structures update code in the first virtual machine to update the plurality of HLAT paging structures, and subsequent to the plurality of HLAT paging structures being updated by the paging structures update code changing the execute permission of the paging structures update code from executable to non-executable, and marking the plurality of HLAT paging structures with the read-only permission.

Example C5 comprises the subject matter of Example C4, and to update the plurality of HLAT paging structures is to include adding mapping information in the HLAT paging structures to enable the processor to translate the GVA to the GPA of the first memory page.

Example C6 comprises the subject matter of any one of Examples C1-C5, and the operations of the hypervisor to be performed by the processor further comprise selecting a second key identifier for a second virtual machine, invoking a third platform configuration instruction to cause the processor to set the integrity mode for the second key identifier, and in response to receiving a pointer to a second plurality of HLAT paging structures to be used to translate a second GVA to a second GPA for a second memory page allocated for the second virtual machine, marking the second plurality of HLAT paging structures with the read-only permission and assigning the second key identifier to the second memory page.

Example C7 comprises the subject matter of Example C6, and the operations of the hypervisor to be performed by the processor further comprise associating the first key identifier with a first plurality of virtual machines running on the hypervisor, and associating the second key identifier with a second plurality of virtual machines running on the hypervisor.

Example C8 comprises the subject matter of any one of Examples C1-C7, and the operations of the hypervisor to be performed by the processor further comprise marking the plurality of HLAT paging structures with limited write permission to allow one or more metadata bits in page table entries of the plurality of HLAT paging structures to be modified during a page walk of the HLAT paging structures.

Example C9 comprises the subject matter of any one of Examples C1-C8, and the operations of the hypervisor to be performed by the processor further comprise allocating extended page table (EPT) paging structures to be used to translate the GPA to a host physical address (HPA) of the first memory page, and the assigning the first key identifier to the first memory page is to include storing the first key identifier in designated bits of a page table entry leaf in a page table of the EPT paging structures, and the page table entry leaf includes other bits containing the HPA.

Example C10 comprises the subject matter of Example C9, and the first key identifier is to be stored in the designated bits of the page table entry leaf in the page table of the EPT paging structures in response to a request from the first guest kernel running in the virtual machine or from a secure guest kernel running in the virtual machine.

Example C11 comprises the subject matter of any one of Examples C1-C10, and one or more integrity values are to be generated for the first memory page in response to determining that the integrity mode is set for the first key identifier.

Example S1 provides a system including a memory for storing instructions of a hypervisor and a processor communicatively coupled to the memory, and the processor is to execute instructions of the hypervisor to select a first key identifier for a first virtual machine, invoke a first platform configuration instruction to configure the first key identifier in the processor including generating an encryption key for the first key identifier and setting an integrity mode for the first key identifier, instantiate the first virtual machine including a first guest kernel, the first guest kernel to allocate a plurality of hypervisor-managed linear address translation (HLAT) paging structures to be used to translate a guest virtual address (GVA) to a guest physical address (GPA) of a first memory page allocated for the first virtual machine, mark the plurality of HLAT paging structures with read-only permission, and assign the first key identifier to the first memory page.

Example S2 comprises the subject matter of Example S1, and the processor is to execute the instructions of the hypervisor further to configure an instruction setting to cause a second platform configuration instruction contained in program code to be executed in the first virtual machine to be intercepted prior to being invoked.

Example S3 comprises the subject matter of Example S2, and the processor is to execute the instructions of the hypervisor further to receive control from the first virtual machine in response to the second platform configuration instruction being intercepted, and block an execution of the second platform configuration instruction based on a determination that the second platform configuration instruction included the first key identifier.

Example S4 comprises the subject matter of any one of Examples S1-S3, and the processor is to execute the instructions of the hypervisor further to, in response to receiving one or more requests from the first virtual machine, temporarily mark the plurality of HLAT paging structures with write permission and temporarily change an execute permission of paging structures update code from non-executable to executable, and the processor is to execute the paging structures update code in the first virtual machine to update the plurality of HLAT paging structures.

Example S5 comprises the subject matter of Example S4, and to update the plurality of HLAT paging structures is to include adding mapping information in the HLAT paging structures to enable the processor to translate the GVA to the GPA of the first memory page.

Example S6 comprises the subject matter of any one of Examples S1-S5, and the processor is to execute the instructions of the hypervisor further to select a second key identifier for a second virtual machine, invoke a third platform configuration instruction to configure the second key identifier in the processor including generating a second encryption key for the second key identifier and setting the integrity mode for the second key identifier, and in response to receiving a pointer to a second plurality of HLAT paging structures to be used to translate a second GVA to a second GPA of a second memory page allocated for the second virtual machine, mark the second plurality of HLAT paging structures with the read-only permission and assign the second key identifier to the second memory page.

Example S7 comprises the subject matter of Example S6, and the processor is to execute the instructions of the hypervisor further to associate the first key identifier with a first plurality of virtual machines running on the hypervisor, and associate the second key identifier with a second plurality of virtual machines running on the hypervisor.

Example S8 comprises the subject matter of any one of Examples S1-S7, and the processor is to execute the instructions of the hypervisor further to mark the plurality of HLAT paging structures with limited write permission to allow one or more metadata bits in page table entries of the plurality of HLAT paging structures to be modified during a page walk of the HLAT paging structures.

Example S9 comprises the subject matter of any one of Examples S1-S8, and the processor is to execute the instructions of the hypervisor further to allocate extended page table (EPT) paging structures to be used to translate the GPA to a host physical address (HPA) of the first memory page, and to assign the first key identifier to the first memory page is to store the first key identifier in designated bits of a page table entry leaf in a page table of the EPT paging structures, and the page table entry leaf is to include other bits containing the HPA.

Example S10 comprises the subject matter of Example S9, and the first key identifier is to be stored in the designated bits of the page table entry leaf in the page table of the EPT paging structures in response to a request from the first guest kernel running in the virtual machine or from a secure guest kernel running in the virtual machine.

Example S11 comprises the subject matter of any one of Examples S1-S10, and the processor includes memory protection circuitry to generate encrypted data or code to be stored in the first memory page using a cryptographic algorithm and the encryption key, and generate one or more integrity values for the encrypted data or code in response to determining that the integrity mode is set for the first key identifier.

Example M1 provides a method comprising selecting, by a hypervisor executing on a processor, a first key identifier, invoking, by the hypervisor, a first platform configuration instruction to cause the processor to generate an encryption key for the first key identifier and to set an integrity mode for the first key identifier, instantiating, by the hypervisor, a first virtual machine including a first guest kernel to allocate a plurality of hypervisor-managed linear address translation (HLAT) paging structures to be used to translate a guest virtual address (GVA) to a guest physical address (GPA) of a first memory page in memory, marking, by the hypervisor, the plurality of HLAT paging structures with read-only permission, and assigning, by the hypervisor, the first key identifier to the first memory page.

Example M2 comprises the subject matter of Example M1, and further comprises configuring an instruction setting to cause a second platform configuration instruction contained in program code to be executed in the first virtual machine to be intercepted prior to being invoked configuring an instruction setting to cause a second platform configuration instruction contained in program code to be executed in the first virtual machine to be intercepted prior to being invoked.

Example M3 comprises the subject matter of Example M2, and further comprising receiving control from the first virtual machine in response to the second platform configuration instruction being intercepted, and blocking an execution of the second platform configuration instruction based on a determination that the second platform configuration instruction included the first key identifier.

Example M4 comprises the subject matter of any one of Examples M1-M3, and further comprising, in response to receiving one or more requests from the first virtual machine, marking the plurality of HLAT paging structures with write permission, and changing an execute permission of paging structures update code from non-executable to executable, and the processor is to execute the paging structures update code in the first virtual machine to update the plurality of HLAT paging structures, and subsequent to the plurality of HLAT paging structures being updated by the paging structures update code, changing the execute permission of the paging structures update code from executable to non-executable, and marking the plurality of HLAT paging structures with the read-only permission.

Example M5 comprises the subject matter of Example M4, and to update the plurality of HLAT paging structures is to include adding mapping information in the HLAT paging structures to enable the processor to translate the GVA to the GPA of the first memory page.

Example M6 comprises the subject matter of any one of Examples M1-M5, and further comprising selecting a second key identifier for a second virtual machine to run on the hypervisor, invoking a third platform configuration instruction to configure the second key identifier in the processor including generating a second encryption key for the second key identifier and setting the integrity mode for the second key identifier, and in response to receiving a pointer to a second plurality of HLAT paging structures to be used to translate a second GVA to a second GPA for a second memory page allocated for the second virtual machine, marking the second plurality of HLAT paging structures with the read-only permission, and assigning the second key identifier to the second memory page.

Example M7 comprises the subject matter of Example M6, and further comprising associating the first key identifier with a first plurality of virtual machines running on the hypervisor, and associating the second key identifier with a second plurality of virtual machines running on the hypervisor.

Example M8 comprises the subject matter of any one of Examples M1-M7, and further comprising marking the plurality of HLAT paging structures with limited write permission to allow one or more metadata bits in page table entries of the plurality of HLAT paging structures to be modified during a page walk of the HLAT paging structures.

Example M9 comprises the subject matter of any one of Examples M1-M8, and further comprising allocating extended page table (EPT) paging structures to be used to translate the GPA to a host physical address (HPA) of the first memory page, and the assigning the first key identifier to the first memory page is to include storing the first key identifier in designated bits of a page table entry leaf in a page table of the EPT paging structures, and the page table entry leaf includes other bits containing the HPA.

Example M10 comprises the subject matter of Example M9, and the first key identifier is to be stored in the designated bits of the page table entry leaf in the page table of the EPT paging structures in response to a request from the first guest kernel running in the virtual machine or from a secure guest kernel running in the virtual machine.

Example M11 comprises the subject matter of any one of Examples M1-M10, and further comprising generating encrypted data or code to be stored in the first memory page using a cryptographic algorithm and the encryption key, and generating one or more integrity values for the encrypted data or code in response to determining that the integrity mode is set for the first key identifier.

Example X1 provides an apparatus for, the apparatus comprising means for performing the method of any one of Examples M1-M11.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of Examples M1-M11.

Example X4 comprises the subject matter of any one of Examples X1-X3 can optionally include that the apparatus is one of a computing system, a processing element, or a system-on-a-chip.

Example X5 provides at least one machine readable storage medium comprising instructions that, when executed, realize an apparatus, realize a system, or implement a method as in any one of Examples A1-A11, S1-S11, or C1-C11.

The invention claimed is:

1. An apparatus comprising:
a processor configured to be communicatively coupled to a memory, wherein the processor is to execute instructions of a hypervisor to:
select a first key identifier for a first virtual machine;
invoke a first platform configuration instruction to cause the processor to set an integrity mode for the first key identifier;
instantiate the first virtual machine including a first guest kernel, the first guest kernel to allocate a plurality of hypervisor-managed linear address translation (HLAT) paging structures to be used to translate a guest virtual address (GVA) to a guest physical address (GPA) of a first memory page allocated for the first virtual machine;
mark the plurality of HLAT paging structures with read-only permission; and
assign the first key identifier to the first memory page.

2. The apparatus of claim 1, wherein the processor is to execute the instructions of the hypervisor further to:
configure an instruction setting to cause a second platform configuration instruction contained in program code to be executed in the first virtual machine to be intercepted prior to being invoked.

3. The apparatus of claim 2, wherein the processor is to execute the instructions of the hypervisor further to:
receive control from the first virtual machine in response to the second platform configuration instruction being intercepted; and
block an execution of the second platform configuration instruction based on a determination that the second platform configuration instruction included the first key identifier.

4. The apparatus of claim 1, wherein the processor is to execute the instructions of the hypervisor further to:
in response to receiving one or more requests from the first virtual machine:
temporarily mark the plurality of HLAT paging structures with write permission; and
temporarily change an execute permission of paging structures update code from non-executable to executable, wherein the processor is to execute the paging structures update code in the first virtual machine to update the plurality of HLAT paging structures.

5. The apparatus of claim 4, wherein to update the plurality of HLAT paging structures is to include adding mapping information in the HLAT paging structures to enable the processor to translate the GVA to the GPA of the first memory page.

6. The apparatus of claim 1, wherein the processor is to execute the instructions of the hypervisor further to:
select a second key identifier for a second virtual machine;
invoke a third platform configuration instruction to cause the processor to set the integrity mode for the second key identifier;
in response to receiving a pointer to a second plurality of HLAT paging structures to be used to translate a second GVA to a second GPA of a second memory page allocated for the second virtual machine, mark the second plurality of HLAT paging structures with the read-only permission; and
assign the second key identifier to the second memory page.

7. The apparatus of claim 6, wherein the processor is to execute the instructions of the hypervisor further to:
associate the first key identifier with a first plurality of virtual machines running on the hypervisor; and
associate the second key identifier with a second plurality of virtual machines running on the hypervisor.

8. The apparatus of claim 1, wherein the processor is to execute the instructions of the hypervisor further to:
mark the plurality of HLAT paging structures with limited write permission to allow one or more metadata bits in page table entries of the plurality of HLAT paging structures to be modified during a page walk of the HLAT paging structures.

9. The apparatus of claim 1, wherein the processor is to execute the instructions of the hypervisor further to:
   allocate extended page table (EPT) paging structures to be used to translate the GPA to a host physical address (HPA) of the first memory page;
   wherein to assign the first key identifier to the first memory page is to store the first key identifier in designated bits of a page table entry leaf in a page table of the EPT paging structures, wherein the page table entry leaf is to include other bits containing the HPA.

10. The apparatus of claim 9, wherein the first key identifier is to be stored in the designated bits of the page table entry leaf in the page table of the EPT paging structures in response to a request from the first guest kernel running in the first virtual machine or from a secure guest kernel running in the first virtual machine.

11. The apparatus of claim 1, wherein the processor is to execute the instructions of the hypervisor further to:
   block the first guest kernel from re-provisioning the first key identifier assigned to the first memory page.

12. A non-transitory machine readable storage medium including instructions stored thereon that, when executed by a processor, cause the processor to perform operations of a hypervisor comprising:
   selecting a first key identifier for a first virtual machine;
   invoking a first platform configuration instruction to cause the processor to set an integrity mode for the first key identifier;
   instantiating the first virtual machine including a first guest kernel to allocate a plurality of hypervisor-managed linear address translation (HLAT) paging structures to be used to translate a guest virtual address (GVA) to a guest physical address (GPA) of a first memory page in memory;
   marking the plurality of HLAT paging structures with read-only permission; and
   assigning the first key identifier to the first memory page.

13. The non-transitory machine readable storage medium of claim 12, the operations of the hypervisor to be performed by the processor further comprising:
   in response to receiving one or more requests from the first virtual machine:
      marking the plurality of HLAT paging structures with write permission; and
      changing an execute permission of paging structures update code from non-executable to executable, wherein the processor is to execute the paging structures update code in the first virtual machine to update the plurality of HLAT paging structures.

14. The non-transitory machine readable storage medium of claim 13, the operations of the hypervisor to be performed by the processor further comprising:
   subsequent to the plurality of HLAT paging structures being updated by the paging structures update code:
      changing the execute permission of the paging structures update code from executable to non-executable; and
      marking the plurality of HLAT paging structures with the read-only permission.

15. The non-transitory machine readable storage medium of claim 12, the operations of the hypervisor to be performed by the processor further comprising:
   selecting a second key identifier for a second virtual machine;
   invoking a third platform configuration instruction to cause the processor to set the integrity mode for the second key identifier;
   in response to receiving a pointer to a second plurality of HLAT paging structures to be used to translate a second GVA to a second GPA for a second memory page allocated for the second virtual machine, marking the second plurality of HLAT paging structures with the read-only permission; and
   assigning the second key identifier to the second memory page.

16. The non-transitory machine readable storage medium of claim 15, wherein the first key identifier is to be associated with a first plurality of virtual machines running on the hypervisor, and wherein the second key identifier is to be associated with a second plurality of virtual machines running on the hypervisor.

17. The non-transitory machine readable storage medium of claim 12, the operations of the hypervisor to be performed by the processor further comprising:
   allocating extended page table (EPT) paging structures to be used to translate the GPA to a host physical address (HPA) of the first memory page;
   wherein the assigning the first key identifier to the first memory page is to include storing the first key identifier in designated bits of a page table entry leaf in a page table of the EPT paging structures, wherein the page table entry leaf includes other bits containing the HPA.

18. The non-transitory machine readable storage medium of claim 12, wherein one or more integrity values are to be generated for the first memory page in response to determining that the integrity mode is set for the first key identifier.

19. A system comprising:
   a memory for storing instructions of a hypervisor; and
   a processor communicatively coupled to the memory, wherein the processor is to execute instructions of the hypervisor to:
      select a first key identifier for a first virtual machine;
      invoke a first platform configuration instruction to configure the first key identifier in the processor including generating an encryption key for the first key identifier and setting an integrity mode for the first key identifier;
      instantiate the first virtual machine including a first guest kernel, the first guest kernel to allocate a plurality of hypervisor-managed linear address translation (HLAT) paging structures to be used to translate a guest virtual address (GVA) to a guest physical address (GPA) of a first memory page allocated for the first virtual machine;
      mark the plurality of HLAT paging structures with read-only permission; and
      assign the first key identifier to the first memory page.

20. The system of claim 19, wherein the processor is to execute the instructions of the hypervisor further to:
   in response to receiving one or more requests from the first virtual machine:
      temporarily mark the plurality of HLAT paging structures with write permission; and
      temporarily change an execute permission of paging structures update code from non-executable to executable, wherein the processor is to execute the paging structures update code in the first virtual machine to update the plurality of HLAT paging structures.

21. The system of claim 19, wherein the processor is to execute the instructions of the hypervisor further to:
   associate the first key identifier with a first plurality of virtual machines running on the hypervisor; and associate a second key identifier with a second plurality of virtual machines running on the hypervisor.

22. The system of claim 19, wherein the processor is to execute the instructions of the hypervisor further to:
allocate extended page table (EPT) paging structures to be used to translate the GPA to a host physical address (HPA) of the first memory page;
wherein to assign the first key identifier to the first memory page is to store the first key identifier in designated bits of a page table entry leaf in a page table of the EPT paging structures, wherein the page table entry leaf is to include other bits containing the HPA.

23. The system of claim 19, wherein the processor includes memory protection circuitry to:
generate encrypted data or code to be stored in the first memory page using a cryptographic algorithm and the encryption key; and
generate one or more integrity values for the encrypted data or code in response to determining that the integrity mode is set for the first key identifier.

24. A method, comprising:
selecting, by a hypervisor executing on a processor, a first key identifier;
invoking, by the hypervisor, a first platform configuration instruction to cause the processor to generate an encryption key for the first key identifier and to set an integrity mode for the first key identifier;
instantiating, by the hypervisor, a first virtual machine including a first guest kernel to allocate a plurality of hypervisor-managed linear address translation (HLAT) paging structures to be used to translate a guest virtual address (GVA) to a guest physical address (GPA) of a first memory page in memory;
marking, by the hypervisor, the plurality of HLAT paging structures with read-only permission; and
assigning, by the hypervisor, the first key identifier to the first memory page.

25. The method of claim 24, further comprising:
allocating extended page table (EPT) paging structures to be used to translate the GPA to a host physical address (HPA) of the first memory page;
wherein the assigning the first key identifier to the first memory page is to include storing the first key identifier in designated bits of a page table entry leaf in a page table of the EPT paging structures, wherein the page table entry leaf includes other bits containing the HPA.

* * * * *